US012696218B2

(12) United States Patent
  Foti

(10) Patent No.: US 12,696,218 B2
(45) Date of Patent: Jul. 28, 2026

(54) SUPPORT OF NETWORK SLICING FOR SMS

(71) Applicant: Telefonaktiebolaget LM Ericsson (publ), Stockholm (SE)

(72) Inventor: George Foti, Quebec (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 516 days.

(21) Appl. No.: 17/639,602

(22) PCT Filed: Oct. 5, 2020

(86) PCT No.: PCT/IB2020/059336
  § 371 (c)(1),
  (2) Date: Mar. 2, 2022

(87) PCT Pub. No.: WO2021/064714
  PCT Pub. Date: Apr. 8, 2021

(65) Prior Publication Data
  US 2022/0346052 A1      Oct. 27, 2022

Related U.S. Application Data

(60) Provisional application No. 62/910,040, filed on Oct. 3, 2019.

(51) Int. Cl.
  *H04W 4/14*      (2009.01)
  *H04W 48/18*      (2009.01)
  *H04W 60/04*      (2009.01)
(52) U.S. Cl.
  CPC ............. *H04W 60/04* (2013.01); *H04W 4/14* (2013.01); *H04W 48/18* (2013.01)

(58) Field of Classification Search
  CPC ........ H04W 4/14; H04W 48/18; H04W 60/04
  See application file for complete search history.

(56) References Cited

U.S. PATENT DOCUMENTS

| | | | | | |
|---|---|---|---|---|---|
| 6,138,006 | A | * | 10/2000 | Foti ........................ | H04M 15/08 |
| | | | | | 455/406 |
| 11,930,428 | B2 | * | 3/2024 | Liu .......................... | H04W 8/02 |
| 12,185,197 | B2 | * | 12/2024 | Long ....................... | H04L 67/02 |
| 2018/0227978 | A1 | * | 8/2018 | Keller ................. | H04L 65/4015 |

(Continued)

OTHER PUBLICATIONS

PCT International Search Report and Written Opinion mailed Jan. 18, 2021 for International Application No. PCT/IB2020/059336, 8 pages.

*Primary Examiner* — Steven S Kelley
(74) *Attorney, Agent, or Firm* — Sage Patent Group

(57) ABSTRACT

Methods and apparatus for providing short message service (SMS) on a network slice basis are provided within a system that includes a wireless device and control plane entities. The wireless device sends a Registration Request message a control plane entity indicating that the Registration is for SMS and receives a Registration Response message comprising the allowed Single Network slice Selection Assistance information (S-NSSAI) that are to be used for the SMS. The control plane entity determines the allowed S-NSSAI for SMS and activates one or more SMS functions for the allowed S-NSSAI for SMS delivery, hence enabling a solution where SMS can be delivered over specific network slices instead of being network slice agnostic.

14 Claims, 20 Drawing Sheets

(56)                    References Cited

U.S. PATENT DOCUMENTS

| | | | | |
|---|---|---|---|---|
| 2018/0376444 A1* | 12/2018 | Kim | ...................... | H04W 76/30 |
| 2019/0029065 A1 | 1/2019 | Park et al. | | |
| 2019/0104455 A1* | 4/2019 | Park | ...................... | H04W 76/30 |
| 2019/0357019 A1* | 11/2019 | Zhu | ......................... | H04W 8/02 |
| 2020/0389843 A1* | 12/2020 | Huang | .................. | H04W 60/04 |
| 2021/0360567 A1* | 11/2021 | Tiwari | .................. | H04W 12/08 |

* cited by examiner

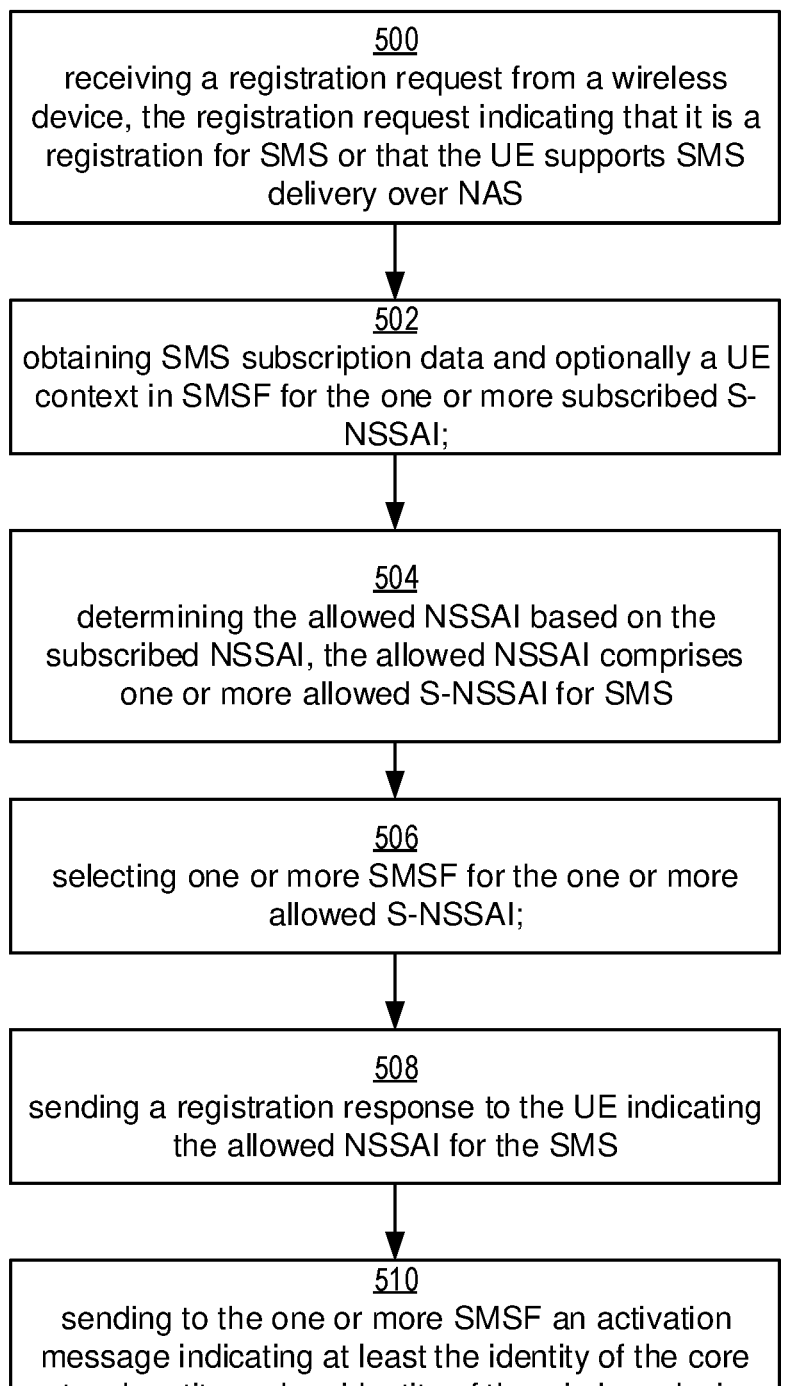
FIG. 7 (AMF)

Figure 8:
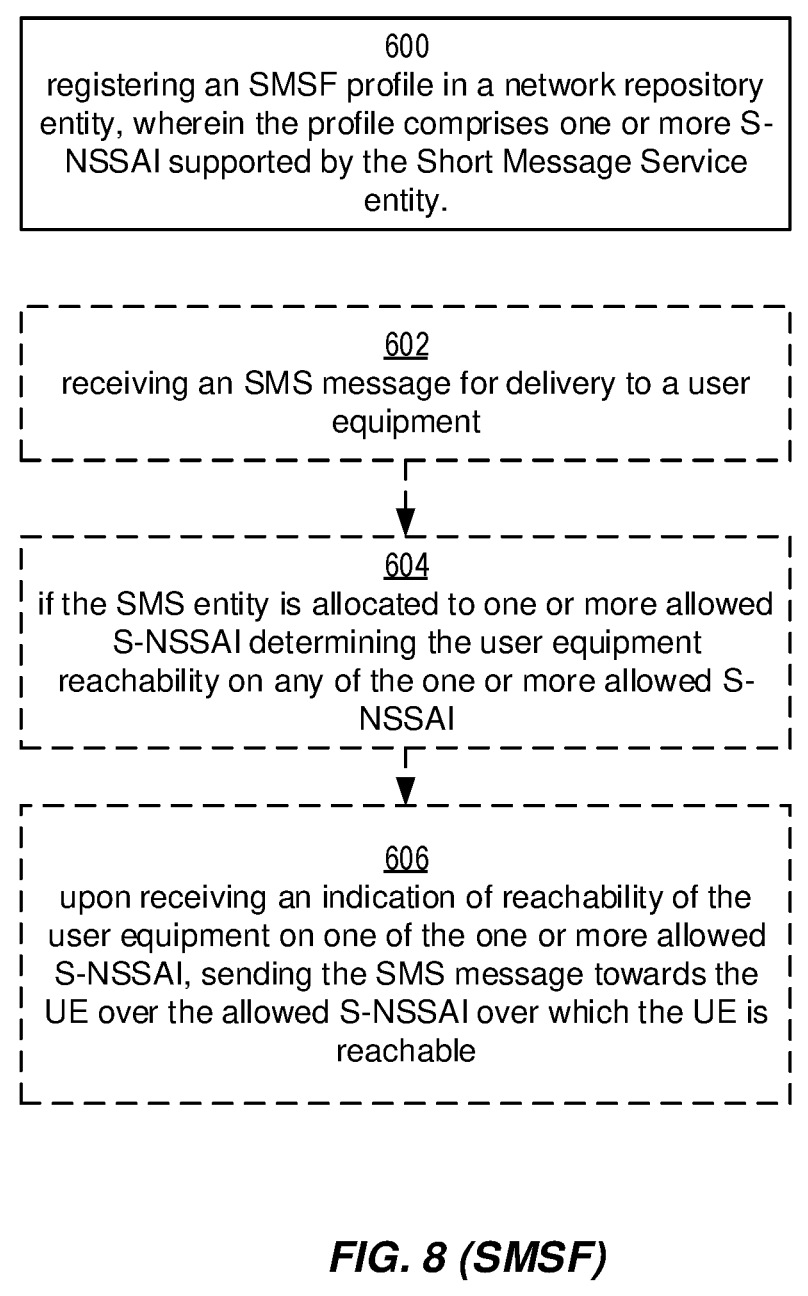

600
registering an SMSF profile in a network repository entity, wherein the profile comprises one or more S-NSSAI supported by the Short Message Service entity.

602
receiving an SMS message for delivery to a user equipment 604
if the SMS entity is allocated to one or more allowed S-NSSAI determining the user equipment reachability on any of the one or more allowed S-NSSAI 606
upon receiving an indication of reachability of the user equipment on one of the one or more allowed S-NSSAI, sending the SMS message towards the UE over the allowed S-NSSAI over which the UE is reachable

FIG. 8 (SMSF)

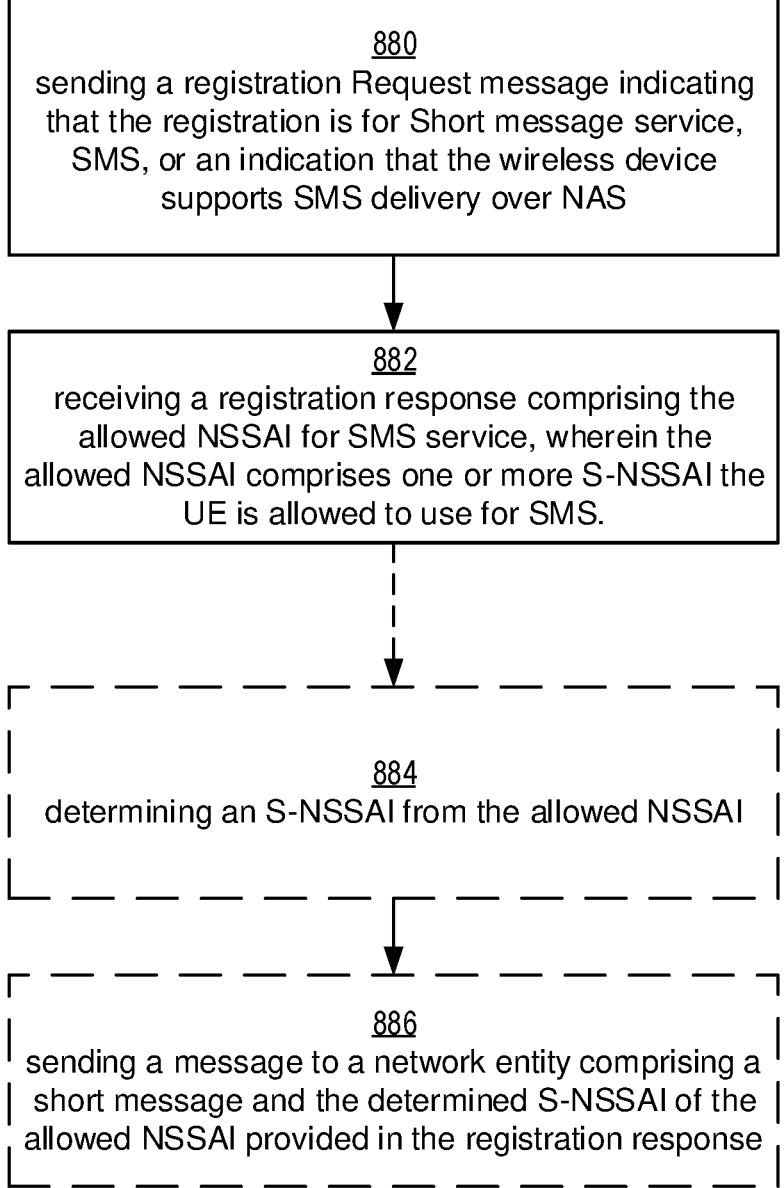
FIG. 9 (UE)

SUPPORT OF NETWORK SLICING FOR SMS

RELATED APPLICATIONS

This application claims the benefit of provisional patent application Ser. No. 62/910,040, filed Oct. 10, 2019, the disclosure of which is hereby incorporated herein by reference in its entirety.

CROSS-REFERENCE TO RELATED APPLICATIONS

This application is a 35 U.S.C. § 371 national stage application for International Application No. PCT/IB2020/059336, entitled "SUPPORT OF NETWORK SLICING FOR SMS", filed on Oct. 5, 2020, the disclosures and contents of which are hereby incorporated by reference in their entireties. Further, the present application claims the benefit of and priority to U.S. Provisional Patent Application No. 62/910,040, filed on Oct. 3, 2019, entitled "SUPPORT OF NETWORK SLICING FOR SMS", the disclosure of which is hereby incorporated herein by reference in its entirety.

TECHNICAL FIELD

The present disclosure relates generally to short message services, and more particularly, to short message service in relation to network slicing.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

3GPP TS 23.501 V.16.2.0 Specify SMS Over NAS as the Following

Support for SMS incurs the following functionality:
  Support for SMS over NAS transport between UE and AMF. This applies to both 3GPP and Non 3GPP accesses.
  Support for AMF determining the SMSF for a given UE.
  Support for subscription checking and actual transmission of MO/MT-SMS transfer by the SMSF.
  Support for MO/MT-SMS transmission for both roaming and non-roaming scenarios.
  Support for selecting proper domains for MT SMS message delivery including initial delivery and re-attempting in other domains.

5G System supports SMS over NAS via both 3GPP access and non-3GPP access.

During Registration procedure, a UE that wants to use SMS provides an "SMS supported" indication over NAS signalling indicating the UE's capability for SMS over NAS transport. "SMS supported" indication indicates whether UE can support SMS delivery over NAS. If the core network supports SMS functionality, the AMF includes "SMS allowed" indication to the UE, and whether SMS delivery over NAS is accepted by the network.

SMS is transported via NAS transport message, which can carry SMS messages as payload.

FIG. 1 (Prior art) illustrates the registration procedure for SMS over NAS as per the current art:

Excerpt from 3GPP TS 23.502, clause 4.13.3.1 describe the steps of FIG. 1.

1. During Registration procedure in 5GS defined in FIG. 4.2.2.2.2-1, to enable SMS over NAS transporting, the UE includes an "SMS supported" indication in Registration Request in step 1-3 indicating the UE's capability for SMS over NAS transport. The "SMS supported" indication indicates whether the UE supports SMS delivery over NAS.

2. Step 4 to step 14 of the Registration procedure in FIG. 4.2.2.2.2-1 are performed. The AMF may retrieve the SMS Subscription data and UE Context in SMSF data using Nudm_SDM_Get. This requires that UDM may retrieve this information from UDR by Nudr_DM_Query. The UDM includes the SMSF information in the Nudm_SDM_Get response message if the stored SMSF belongs to the same PLMN of the AMF. After a successful response is received and if SMS service is allowed, the AMF subscribes to be notified using Nudm_SDM_Subscribe when the SMS Subscription data is modified, and UDM may subscribe to UDR by Nudr_DM_Subscribe.

The AMF can also receive UE context information containing SMSF Information from old AMF. When AMF re-allocation happens during the Registration procedure, the old AMF transfers SMSF Information to the new AMF as part of UE context in step 5 of FIG. 4.2.2.2.2-1.

3. If the "SMS supported" indication is included in the Registration Request, the AMF checks in the SMS Subscription data that was received in step 2 whether the SMS service is allowed to the UE. If SMS service is allowed and the UE context received in step 2 includes an available SMSF of the serving PLMN, the AMF activates this SMSF Address and continues the registration procedure. If SMS service is allowed but an SMSF of the serving PLMN was not received in step 2, the AMF discovers and selects an SMSF to serve the UE as described in clause 6.3.10 of TS 23.501 [2].

4. Step 15 to step 20 of the Registration procedure in FIG. 4.2.2.2.2-1 are performed.

5. The AMF invokes Nsmsf_SMService_Activate service operation from the SMSF. The invocation includes AMF address, Access Type, Trace Requirements, GPSI (if available) and SUPI. AMF uses the SMSF Information derived from step 3. Trace Requirements is provided if it has been received by AMF as part of subscription data.

6. The SMSF discovers a UDM as described in TS 23.501 [2], clause 6.3.8. 7a-7b. If the UE context for the current Access Type already exists in the SMSF, the SMSF shall replace the old AMF address with the new AMF address.

Otherwise, the SMSF registers with the UDM using Nudm_UECM_Registration with Access Type. As a result, the UDM stores the following information: SUPI, SMSF identity, SMSF address, Access Type in UE Context in SMSF data. The UDM may further store SMSF Information in UDR by Nudr_DM_Update (SUPI, Subscription Data, UE Context in SMSF data). SMSF retrieves SMS Management Subscription data (e.g., SMS teleservice, SMS barring list) using Nudm_SDM_Get and this requires that UDM may get this information from UDR by Nudr_DM_Query (SUPI, Subscription Data, SMS Management Subscription data). After a successful response is received, the SMSF subscribes to be notified using Nudm_SDM_Subscribe when the SMS Management Subscription data is modified and UDM may subscribe to notifications from UDR by Nudr_DM_Subscribe.

SMSF also creates a UE context to store the SMS subscription information and the AMF address that is serving this UE.

8. The SMSF responds back to the AMF with Nsmsf_SM-Service_Activate service operation response message. The AMF stores the SMSF Information received as part of the UE context.

9. The AMF includes the "SMS allowed" indication to the UE in the Registration Accept message of step 21 of FIG. 4.2.2.2.2-1 only after step 8 in which the AMF has received a positive indication from the selected SMSF. The "SMS allowed" indication in the Registration Accept message indicates to the UE whether the network allows the SMS message delivery over NAS.

Once the UE is registered and is in CM-IDLE state and the UE is going to send uplink SMS message, then UE and network perform the UE Triggered Service Request procedure to establish a NAS signalling connection to AMF. If the UE is in CM connected mode, then the UE triggered service request is skipped. The UE builds the SMS message to be sent (i.e. the SMS message consists of CP-DATA/RP-DATA/TPDU/SMS-SUBMIT parts). The SMS message is encapsulated in an NAS message with an indication indicating that the NAS message is for SMS transporting. The UE send the NAS message to the AMF. The AMF forwards the SMS message and SUPI to the SMSF serving the UE over N20 message by invoking Nsmsf_SMService_UplinkSMS service operation. In order to permit the SMSF to create an accurate charging record, the AMF adds the IMEISV, the current UE Location Information (ULI) of the UE. The SMSF invokes Namf_Communication_N1N2MessageTransfer service operation to forward SMS ack message to AMF. The AMF forwards the SMS ack message from the SMSF to the UE using downlink unit data message. The SMSF checks the SMS management subscription data. If SMS delivery is allowed, it proceeds to deliver the message via an SMSGW/SC or the likes and forwards the submit report to AMF by invoking Namf_Communication_N1N2MessageTransfer service operation which is forwarded to UE via Downlink NAS transport.

Similarly, when a short message (SM) is received at the SM-GMSC/SMSGW/SC for delivery to the UE, the SM-GMSC/SMSGW/SC queries the USM/UDR for the SMF. If there are two AMFs serving the UE, one is for 3GPP access and another is for non-3GPP access, there are two SMSF addresses stored in UDM/UDR. The UDM shall return both SMSF addresses. When the SMSF receives the message, it checks the SMS management subscription data. If SMS delivery is allowed, SMSF invokes Namf MT_En-ableUEReachability service operation to AMF. AMF pages the UE. The UE responds to the page with Service Request procedure. The SMSF forward the SMS message to be sent to AMF by invoking Namf_Communication_N1N2MessageTransfer service operation. The AMF transfers the SMS message to the UE. The UE, subsequently acknowledges receipt of the SMS message to the SMSF. For uplink unitdata message toward the SMSF, the AMF invokes Nsmsf_SMService_UplinkSMS service operation to forward the message to SMSF.

The UE also returns a delivery report encapsulated in an NAS message to the AMF which is forwarded to SMSF by invoking Nsmsf_SMService_UplinkSMS service operation. The SMSF acknowledges receipt of the delivery report to the UE. The SMSF uses Namf_Communication_N1N2MessageTransfer service operation to send SMS CP ack message to the AMF. The AMF encapsulates the SMS message via a NAS message to the UE.

SUMMARY

The current SMS over NAS solution as described above supports SMS service delivery to and from the UE over any slice, i.e., regardless or independently of the network slice that the UE is allowed to use. However, requirements emerged for the need to support Slicing for SMS. This means that SMS may be allowed on some slices but not on all slices. One of the key uses cases is that for example corporate related SMS may be allowed to go on specific slices that have some specific network characteristics and security requirements that are not applicable to other types of SMS that can go on any slice.

SMS in general is not protected nor encrypted and at least this approach may somehow enable additional security for these SMSs. In order to control the SMS service per one or more allowed network slice in 3GPP 5G system, the current 5G procedures as described in 3GPP TS 23.502 v.16.2.0 should be changed in accordance with the examples described herein. The examples described herein are described using 5G system as an example, it is however apparent to a skilled person that the procedures described herein may apply to any system using network slicing concept or similar.

Certain aspects of the present disclosure and their embodiments may provide solutions to the aforementioned or other challenges. The present disclosure proposes a mechanism in Fifth Generation System (5GS) to provide SMS service on a per network slice. However, the proposed solution can apply to any system that supports network slicing or network partitions.

A function refers to a network function that can be implemented either as a network element on a dedicated hardware, such as a node, as a software instance running on a dedicated hardware, or as a virtualized function instantiated on an appropriate platform, server or distributed servers, e.g., on any cloud infrastructure.

The function can be further characterized as a Control Plane (CP) function or a User Plane function. An entity herein refers to a function.

The following summarizes the main aspects of the invention that enables SMS to be used on an authorized/allowed network slice and the SMS to be delivered over a specific allowed network slice instead of all network slices.

According to one aspect, a method performed by a wireless device is provided that comprises the wireless device sending a Registration Request message to an Access and Mobility Management Function where the message comprises an indication that the registration is for Short Message Service, SMS, or an indication that the wireless device supports SMS delivery over Non-Access Stratum (NAS) and receiving a Registration Response message comprising an allowed Network slice Selection Assistance information (NSSAI) indicating one or more allowed Single NSSAI (S-NSSAI) for the SMS which the wireless device is allowed to use for delivery of the SMS.

According to another aspect, the wireless device performs the step of determining that a short message is to be transmitted, e.g., triggered by the user of the UE or by an application hosted at the UE, determining an S-NSSAI from the one or more allowed S-NSSAI for the SMS received in the Registration Response message and sending a message comprising the short message and the determined S-NSSAI on which the SMS is allowed to be used.

According to another aspect, the Registration Request message also comprises requested NSSAI indicating one or more requested S-NSSAI for the SMS.

According to another aspect, the method further comprises the step of receiving from a network entity, e.g., AMF in 5G Core, an indication to add, replace, or remove one or more of the allowed S-NSSAI for the SMS.

According to another aspect, a method performed by a core network control plane entity is provided, comprising the steps of receiving a Registration Request message from a wireless device (e.g., UE or Internet of Things, IoT, device), the Registration Request comprising an indicator that the registration is for Short Message Service, SMS, or an indication that the wireless device supports SMS delivery over Non-Access Stratum (NAS), obtaining SMS subscription data comprising one or more subscribed Single Network slice Selection Assistance information (S-NSSAI) for the SMS, determining the one or more allowed S-NSSAI for the SMS based on the one or more subscribed S-NSSAI for the SMS, selecting a Short Message Service Function (SMSF) for the at least one of the one or more allowed S-NSSAI for the SMS, sending a Registration Response message to the wireless device indicating the one or more allowed S-NSSAI for the SMS; and sending to the SMSF selected for the at least one of the one or more allowed S-NSSAI for the SMS an activation message indicating at least the identity of the core network control plane entity and an identity of the wireless device.

The core network control plane entity, such as AMF, determines the allowed NSSAI for the SMS and performs SMSF discovery and selection for the allowed NSSAI for SMS. If more than one S-NSSAI is allowed for SMS in the allowed NSSAI, one SMSF may be allocated for all the S-NSSAI of the allowed NSSAI that are allowed for SMS or more than one SMSF is allocated for different S-NSSAI of the allowed NSSAI for SMS. The relationship between SMSF and network slice is one to one or one to many S-NSSAI as registered in the NRF. Alternatively, the control plane entity, e.g., AMF may be configured with that information or it may obtain it via other means such as PCF, UDM or O&M node.

According to an aspect, the method at the core network control plane entity further comprises obtaining at least one of a wireless device context in SMSF for one or more subscribed S-NSSAI and a wireless device context in SMSF for the one or more allowed S-NSSAI, where the wireless device context in SMSF for the one or more subscribed S-NSSAI indicates an identity of the SMSF for each of the one or more subscribed S-NSSAI and the wireless device context in SMSF for the one or more allowed S-NSSAI indicates an identity of the SMSF for each of the one or more allowed S-NSSAI.

According to another aspect, the core network control plane entity performs the step of selecting the SMSF for each of the one or more allowed S-NSSAI for the SMS is based on the obtained wireless device context in SMSF, which may be obtained from a User Data Management function (UDM). The control plane entity (AMF if 5G Core) receives subscription data from the UDM where the data related to SMS subscription data may be provided at the S-NSSAI level which is different from the current art. If not provided at S-NSSAI level, then this implies that the SMS parameters received as part of the subscription data apply to all S-NSSAI except for the S-NSSAI(s) associated with an entry if one is provided.

The wireless device context in SMSF for the one or more allowed S-NSSAI may be obtained from a policy Control Function (PCF) and/or Network Registry Function (NRF) or from an internal configuration.

According to another aspect, the method further comprises receiving by the core network control plane entity, a NAS message comprising a SMS message, the NAS message comprising one of the allowed S-NSSAI, determining based on the allowed S-NSSAI the corresponding SMSF and forwarding the SMS message to the SMSF for the allowed S-NSSAI.

According to another aspect, the core network control plane entity further executes the steps of receiving a request message from the SMSF to determine reachability of the wireless device over one of the allowed S-NSSAI, determining the reachability of the wireless device over the allowed S-NSSAI; and upon determining the wireless device is reachable, receiving an SMS message for delivery to the wireless device on the allowed S-NSSAI.

According to another aspect, the core network control plane entity further executes the steps of receiving an indication for an SMS message to be delivered to the wireless device over an S-NSSAI that that was not indicated to the wireless device as one of the allowed S-NSSAI, instructing the UE to add the S-NSSAI into the one or more allowed S-NSSAI or to register for SMS requesting the S-NSSAI, and delivering the SMS message to the UE over the S-NSSAI.

In accordance with one aspect, a method performed by a Short Message Service function (SMSF) entity is provided where the SMSF entity executes the step of registering an SMSF profile in a network repository entity, wherein the profile comprises one or more S-NSSAI supported by the SMSF entity.

In accordance with another aspect, the SMSF performs receiving a request comprising a short message service (SMS) message for delivery to a user equipment (UE). Upon determining the SMS entity is allocated to one or more S-NSSAI determining the user equipment reachability on one of the one or more S-NSSAI and upon determining reachability of the user equipment on one of the one or more S-NSSAI, sending the SMS message towards the UE indicating the S-NSSAI over which the SMS message is to be delivered. In one aspect the request includes one of the S-NSSAI for the SMS.

In another aspect, the step of determining the user equipment reachability on any of the one or more S-NSSAI further comprises selecting the S-NSSAI for which reachability of the UE is to be determined.

In another aspect, upon receiving an indication that the UE is not reachable over the selected S-NSSAI, the SMSF entity performs the step of selecting another S-NSSAI of the one or more S-NSSAI over which reachability of the UE is to be determined.

In another aspect, if the SMSF entity is receiving an indication that the UE is not reachable over the S-NSSAI, which may be the S-NSSAI included in the request, notifying an originator of the request that the SMS message is not deliverable over the S-NSSAI.

According to one example, the SMSF uses the NRF to register its profile to indicate the network slice it is used in. This enables an AMF to select the correct SMSF for the slice.

According to another aspect, for mobile originating SMS, the wireless device or User Equipment (UE) indicates the network slice for the SMS and if the S-NSSAI provided by the wireless device/UE corresponds to one of the allowed S-NSSAI in the registration the SMS is delivered using the SMSF selected for the S-NSSAI. If the wireless device/UE has not included an allowed S-NSSAI in the NAS message for SMS, then the AMF may select an SMSF corresponding to any of the allowed S-NSSAI and delivers the SMS. Alternatively, it may reject the NAS message if it requires the S-NSSAI to be provided by the wireless device/UE. The wireless device/UE may then retry, this time providing an S-NSSAI which may be selected by the user if the user is prompted to select the network slice.

In one aspect a wireless device (e.g., UE or IoT device) is provided wherein the wireless device performs the method according to any embodiments herein.

In another aspect network functions implementing a control plane entity such s AMF and SMSF are provided wherein the network functions performs the method according to any embodiments herein. The network function is implemented on a dedicated hardware or virtualized on a server or distributed server system.

In other aspects, the present disclosure also provides corresponding non-transitory computer readable media, circuitry, and computer program products configured to perform the methods described herein according to the present embodiments.

BRIEF DESCRIPTION OF THE DRAWINGS

FIG. 7 is a flow chart for the CP entity, AMF, according to embodiments of the present disclosure.

FIG. 8 is a flow chart for the CP entity, SMSF, according to embodiments of the present disclosure.

FIG. 9 is a flow chart for the wireless device according to embodiments of the present disclosure.

DETAILED DESCRIPTION

Figure 1:
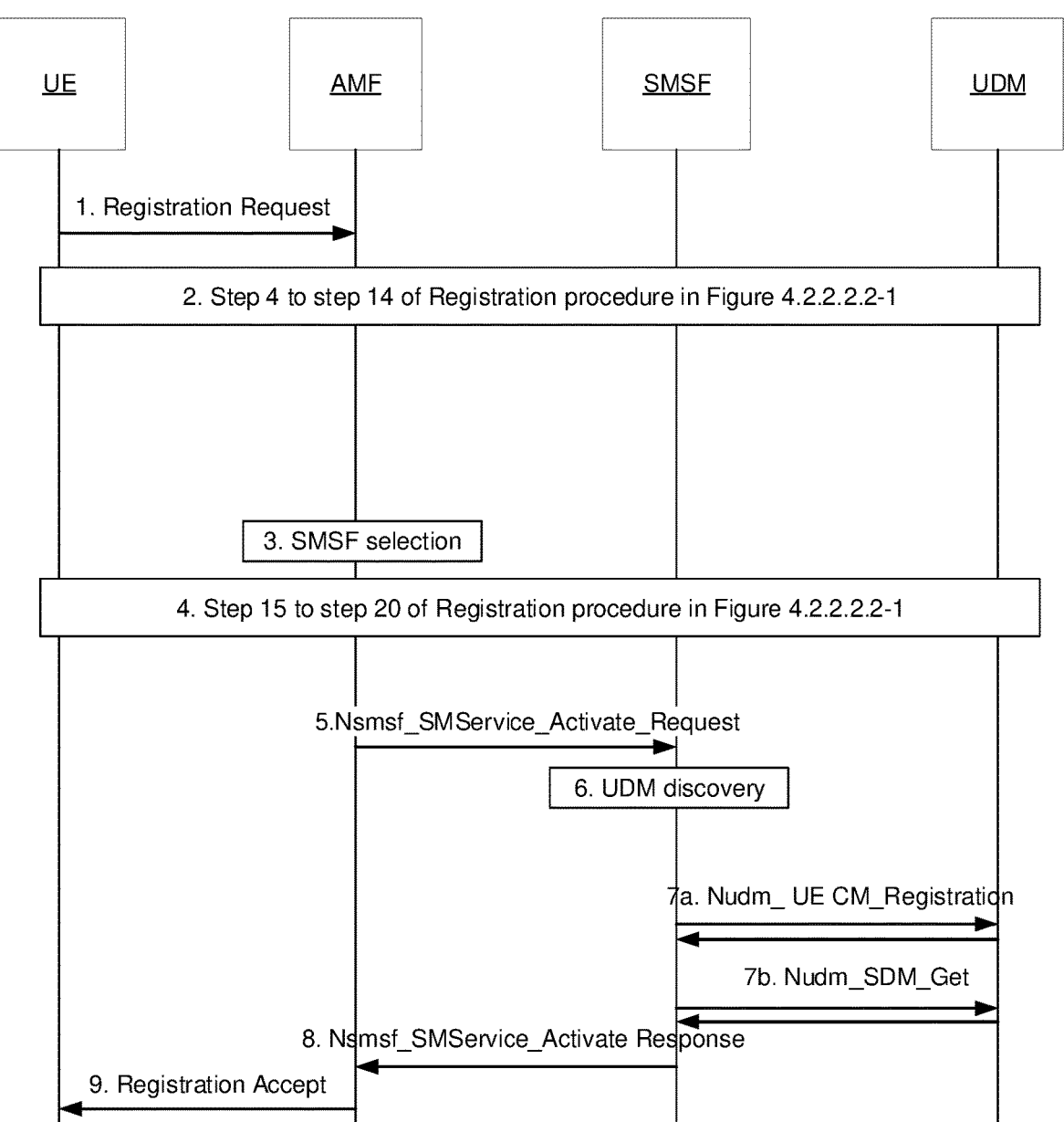
FIG. 1 (Prior Art) is a flow diagram illustrating Support for SMS over NAS transport as currently described in 3GPP.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

CP or UP Function: A function in a network, which has a defined functional behavior and defined interfaces.

Network slice also referred to as slice: 3GPP TS 23.501 defines network slice as the following: A Network Slice instance is defined within a PLMN and shall include the Core Network Control Plane and User Plane Network Functions and, in the serving PLMN, at least one of the following: the NG Radio Access Network and the N3IWF functions to the non-3GPP Access Network. The network may serve a single UE with one or more Network Slice instances simultaneously via a 5G-AN regardless of the access type(s) over which the UE is registered (i.e. 3GPP Access and/or N3GPP Access). The AMF instance serving the UE logically belongs to each of the Network Slice instances serving the UE, i.e. this AMF instance is common to the Network Slice instances serving a UE. The selection of the set of Network Slice instances for a UE is triggered by the first contacted AMF in a Registration procedure normally by interacting with the NSSF, and can lead to a change of AMF.

Note that a network function can be implemented either as a network element on a dedicated hardware, as a software instance running on a dedicated hardware, or as a virtualised function instantiated on an appropriate platform, e.g., on a cloud infrastructure.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
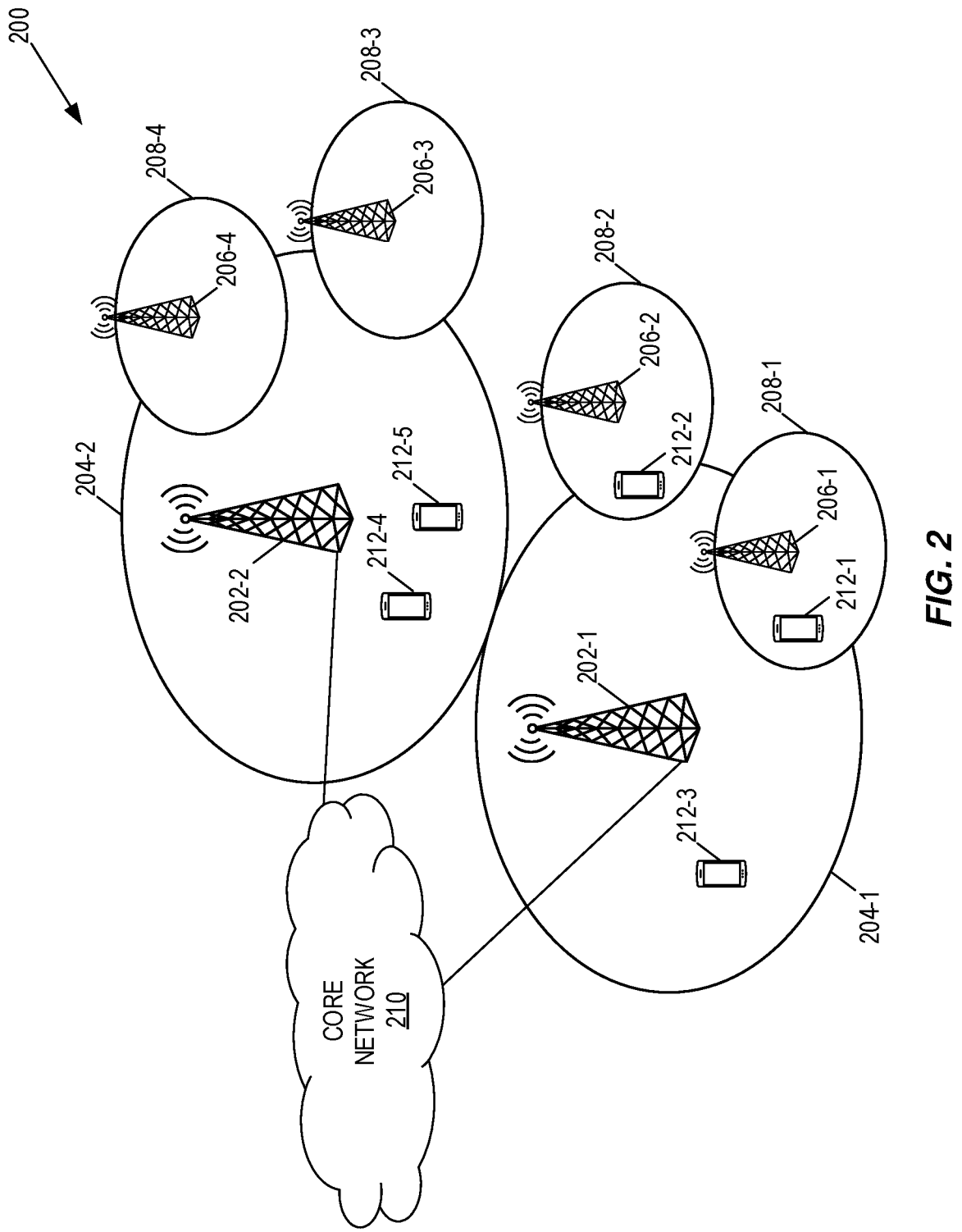
FIG. 2 is a functional block diagram illustrating a cellular telecommunication system configured according to one embodiment of the present disclosure.

FIG. 2 illustrates one example of a cellular communications system 200 in which embodiments of the present disclosure may be implemented. In the embodiments described herein, the cellular communications system 200 is a 5G system (5GS) including a NR Radio Access Network (RAN) or an Evolved Packet System (EPS) including a LTE RAN. In this example, the RAN includes base stations 202-1 and 202-2, which in LTE are referred to as eNBs and in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
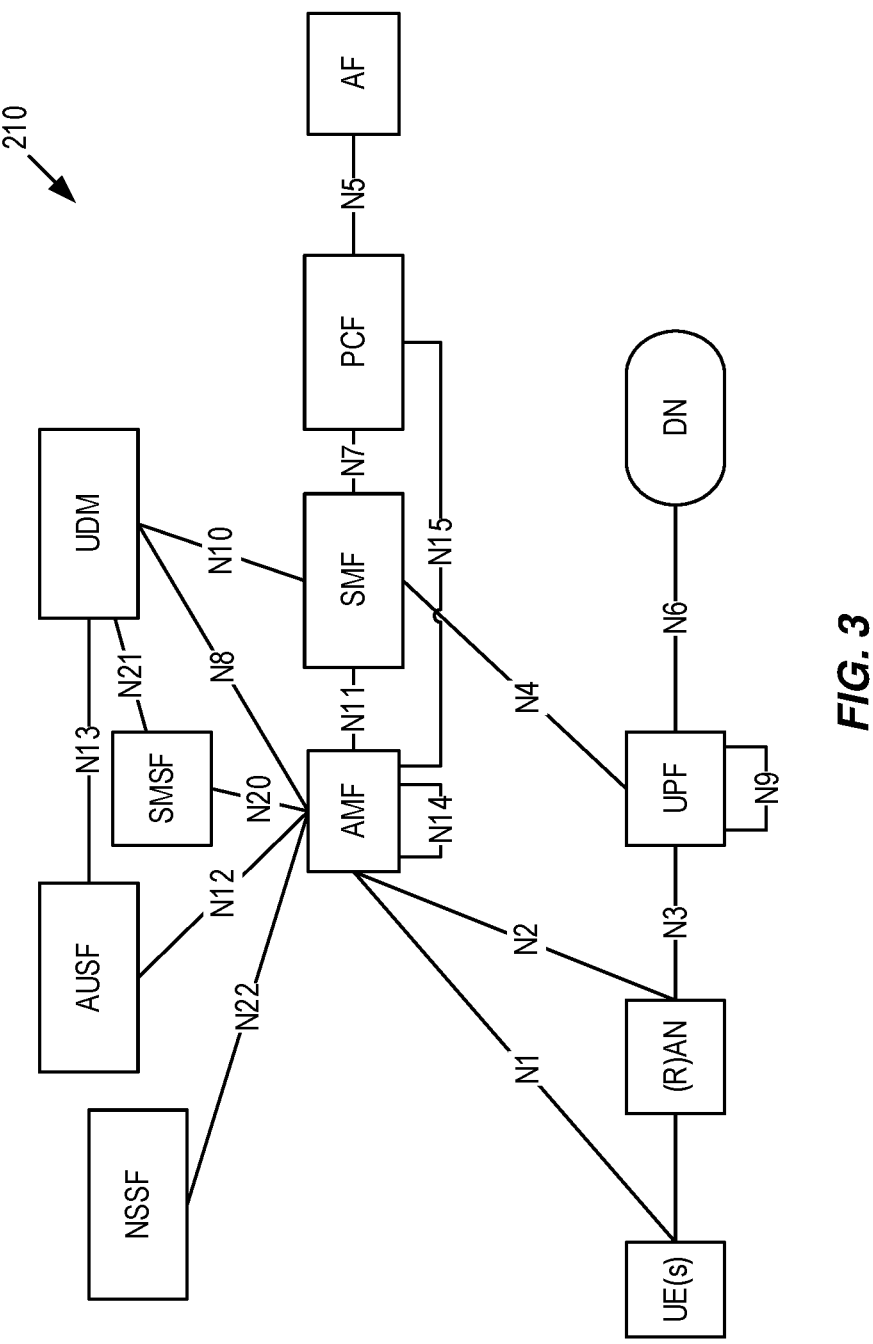
FIG. 3 is a functional block diagram illustrating a point to point view of the $5^{th}$ Generation Core Network used to describe embodiments of the present disclosure.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 3 include a Network Slice Selection Function (NSSF), an Authentication Server Function (AUSF), a Unified Data Management (UDM), an AMF, an SMS Function (SMSF), a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF. N20 is a reference point for SMS transfer between AMF and SMSF, and N21 is a reference point for SMS Function address registration management and SMS Management Subscription data retrieval between SMSF and UDM.

The 5G core network aims at separating user plane and control plane. The user plane carries user traffic while the control plane carries signaling in the network. In FIG. 3, the UPF is in the user plane and all other NFs, i.e., the AMF, SMF, PCF, SMSF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly or indirectly and the architecture in FIG. 3 illustrates the NF interactions. When interacting indirectly, an intermediate function (such as an SCP) is used to route messages from one NF to another NF. In the control plane, a set of interactions between two NFs is defined as service so that its reuse is possible. This service enables support for modularity. The user plane supports interactions such as forwarding operations between different UPFs.

Figure 4:
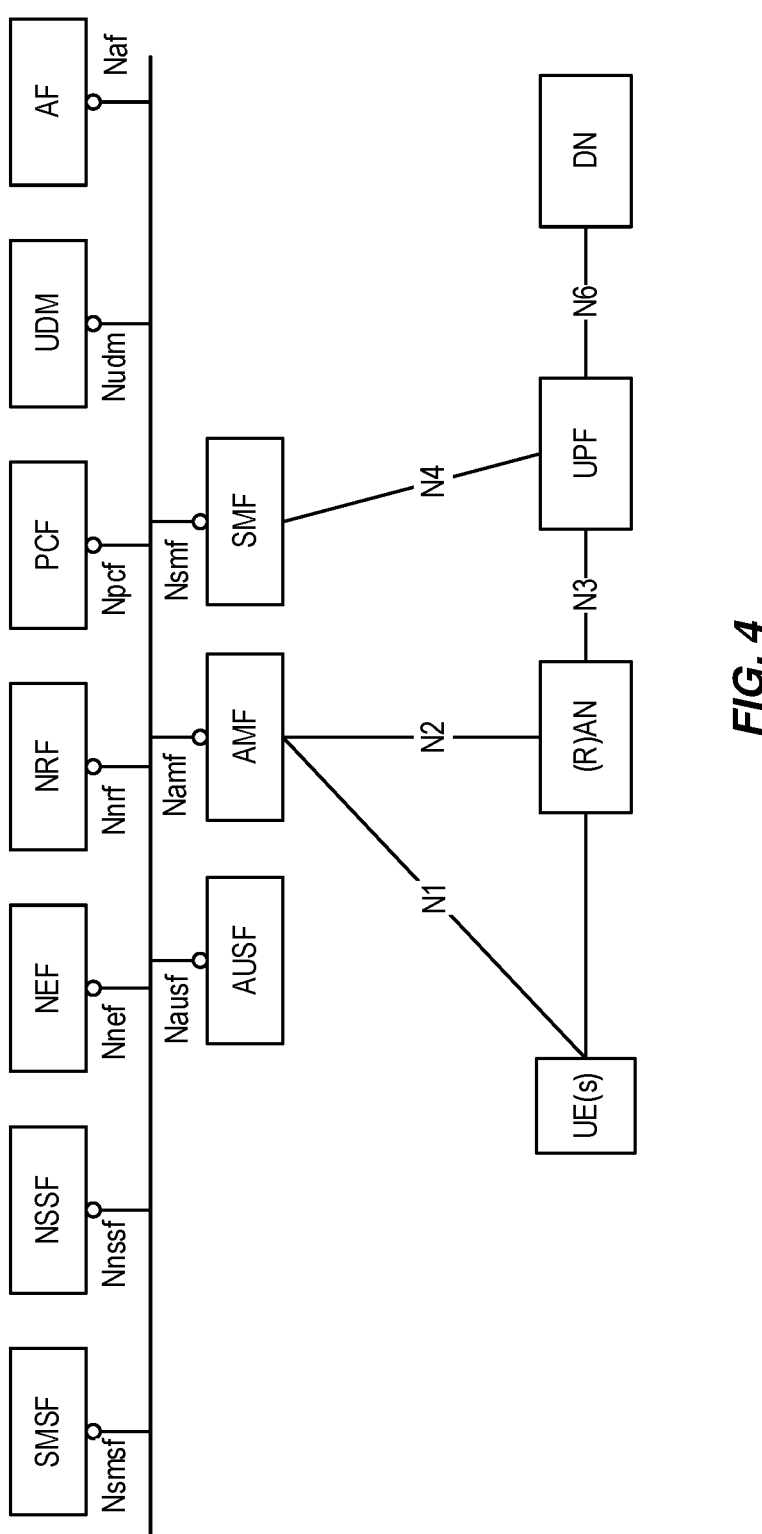
FIG. 4 is a functional block diagram illustrating a Service based architecture of a $5^{th}$ Generation Core Network according to one embodiment of the present disclosure.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g., Namf for the service based interface of the AMF and Nsmf for the service based interface of the SMF, Nsmsf is the Service-based interface exhibited by SMSF etc. The Network Exposure Function (NEF) and the Network Function (NF) Repository Function (NRF) in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMSF supports functionality to support SMS over NAS, such as SMS management subscription data checking and conducting SMS delivery to and from the UE, relay the Short Message (SM) from UE toward SMS GW/SMS-Router and relay the SM from SMS GW/SMS-Router toward the UE, generate SMS related CDR and Interacts with AMF and SMS GW for notification procedure that the UE is unavailable for SMS transfer (i.e, notifies SMS GW to inform UDM when UE is unavailable for SMS).

The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

The present disclosure proposes a mechanism to enable the SMS service on one or more specific slices.

Registration for SMS on Network Slices

Figure 5:
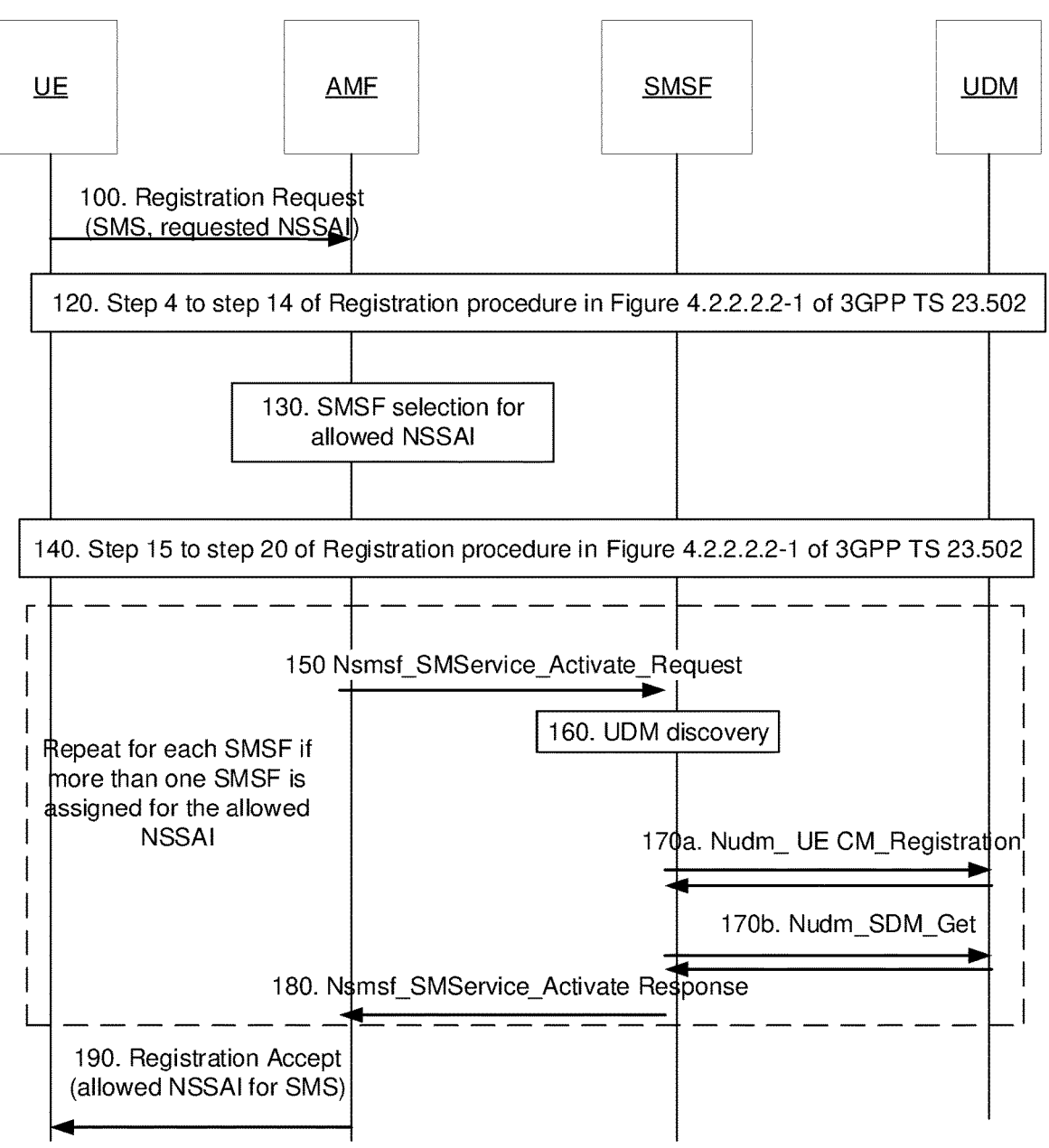
FIG. 5 is a flow diagram illustrating a Registration procedure for SMS according to embodiments of the present disclosure.

FIG. 5 illustrates an example interaction between a UE and CP functions to register a UE for SMS for the allowed network slices in accordance with the subject matter of the present disclosure. The CP functions involved in 5GS comprise AMF, SMSF and UDM. Different alternatives are described. The embodiments herein are described for a 5G system. It is however apparent for a skilled person in the art that the invention can be applied to any other system supporting network slicing or similar concept of network slicing.

At step 100, the UE sends a registration request to the AMF, the registration request to enable SMS over NAS transporting, the UE includes an "SMS supported" indication in Registration Request indicating the UE's capability for SMS over NAS transport. The "SMS supported" indication indicates whether the UE supports SMS delivery over NAS. The UE may include the requested NSSAI that may comprise one or more S-NSSAI in the requested NSSAI to indicate that SMS is expected to be supported on all the requested network slice. Alternatively, the UE may include only one S-NSSAI in the requested NSSAI if the UE wants to register for SMS in one network slice only at a time.

Step 120 is similar to Step 4 to step 14 of the Registration procedure in FIG. 4.2.2.2.2-1 as described in 3GPP TS 23.502 V.16.2.0 are performed. The AMF may retrieve the SMS Subscription data and UE Context in SMSF data using Nudm_SDM_Get. This requires that UDM may retrieve this information from UDR by Nudr_DM_Query. The UDM includes the SMSF information in the Nudm_SDM_Get response message if the stored SMSF belongs to the same PLMN of the AMF. The Nudm_SDM_Get Response may also include one more SMS subscription data per subscribed S-NSSAI and may include one or more UE context SMSF for one or more S-NSSAI. After a successful response is received and if SMS service is allowed for a subscribed S-NSSAI, the AMF subscribes to be notified using Nudm_SDM_Subscribe when the SMS Subscription data is modified for the subscribed S-NNSAI, and UDM may subscribe to UDR by Nudr_DM_Subscribe. In the UDM, only one SMSF may be configured for all the network slices or for a subset of the S-NSSAI.

Step 140. If requested NSSAI is included in the registration request for SMS, the AMF determines if the requested NSSAI corresponds to the allowed NSSAI that is determined by the AMF based on the received subscribed NSSAI from the UDM and perhaps local policy. If the requested NSSAI is not included in the registration request message for SMS, the AMF determines allowed NSSAI from the subscribed NSSAI and perhaps local policy. If the "SMS supported" indication is included in the Registration Request, the AMF checks in the SMS Subscription data that was received in step 120 whether the SMS service is allowed to the UE in the one or more allowed NSSAI. If SMS service is allowed in one or more allowed NSSAI (all or a subset) and the UE context received in step 120 includes an available SMSF of the serving PLMN for one or more of the allowed S-NSSAI (note that allowed NSSAI may in some cases correspond to subscribed NSSAI, else allowed NSSAI is derived from subscribed NSSAI as well as local PLMN policy), the AMF activates the SMSF Address for the one or more allowed NSSAI and continues the registration procedure. If SMS service is allowed in an S-NSSAI but an SMSF of the serving PLMN was not received in step 120, the AMF discovers and selects an SMSF to serve the UE in the allowed S-NSSAI.

In another alternative, if the UE is only allowed to register for SMS in one S-NSSAI and is allowed to use SMS only in that S-NSSAI, the AMF will perform the above but only within that one S-NSSAI.

Step 140. The step 15 to step 20 of the Registration procedure in FIG. 4.2.2.2.2-1 of 3GPP TS 23.502 V.16.2.0 are performed. The details are not repeated herein.

Step 150. The AMF invokes Nsmsf_SMService_Activate service operation from the SMSF associated to the allowed S-NSSAI. If more than one S-NSSAI is allowed and more than one SMSF are assigned for one or more allowed S-NSSAI, the AMF invokes the procedure with each of the SMSF. The invocation includes AMF address, Access Type, Trace Requirements, GPSI (if available) and SUPI as well as the one or more allowed S-NSSAI it corresponds to.

Step 160. The SMSF or the one or more SMSF for the one or more allowed S-NSSAI discovers a UDM as described in TS 23.501, clause 6.3.8. Only one UDM is selected for the one or more S-NSSAI.

Step 170a. The SMSF(S) for the one or more S-NSSAI registers with the UDM using Nudm_UECM_Registration with Access Type. As a result, the UDM stores the following information for a UE: S-NSSAI, SMSF identity, SMSF address, Access Type in UE Context in SMSF data. The UDM may further store SMSF Information in UDR by Nudr_DM_Update (SUPI, Subscription Data, UE Context in SMSF data). At step 170b, SMSF(s) for one or more S-NSSAI retrieve SMS Management Subscription data (e.g., SMS teleservice, SMS barring list) using Nudm_SDM_Get and this requires that UDM may get this information from UDR by Nudr_DM_Query (SUPI, Subscription Data, SMS Management Subscription data). After a successful response is received, each SMSF, if more than one SMSF for the one or more allowed S-NSSAI subscribes to be notified using Nudm_SDM_Subscribe when the SMS Management Subscription data is modified and UDM may subscribe to notifications from UDR by Nudr_DM_Subscribe. Obviously if the UE is allowed one S-NSSAI for the SMS service (i.e., UE registered for one S-NSSAI), the above is performed only for one SMSF specifying the corresponding S-NSSAI, i.e., allowed S-NSSAI. Each of the SMSF for the one or more S-NSSAI if more than one SMS is used also creates a UE context to store the SMS subscription information and the AMF address that is serving this UE.

At step 180, the SMSF(s) for the one or more S-NSSAI responds back to the AMF with Nsmsf_SMService_Activate service operation response message. The AMF stores the SMSF Information or each of the SMSF information received as part of the UE context. If more than one SMSF is used per allowed NSSAI when the allowed NSSAI includes more than one S-NSSAI, the AMF stores SMSF information for each of the SMSF.

Step 190. The AMF includes the "SMS allowed" indication to the UE in the Registration Accept message and the message comprises the allowed NSSAI indicating one or more S-NSSAI to be used for SMS. The "SMS allowed" indication in the Registration Accept message indicates to the UE whether the network allows the SMS message delivery over NAS.

Mobile Originated SMS on a Network Slice

In Mobile originated SMS, the UE, following the registration procedure may receive an allowed NSSAI with one S-NSSAI only (as selected by the network) or more than one allowed S-NSSAI for SMS.

If more than one S-NSSAI is received in the allowed NSSAI, the UE determines the S-NSSAI to use for sending an SMS. Such determination may be based on the application sending the message. The UE may also have received policy information from the network (e.g., USRP rules) to configure the applications with the S-NSSAI for SMS.

Once the UE determines the allowed S-NSSAI to use for SMS, the UE sends the SMS message in for example an Uplink NAS transport message which would also include the allowed S-NSSAI. Alternatively, the UE may potentially indicate more than one allowed S-NSSAI in the NAS message if more than one S-NSSAI is transmitted to the UE in the registration response message of FIG. 5 and the UE lets the network decide which slice to use.

When the AMF receives the NAS message indicating an originating SMS to be delivered, the AMF verifies the allowed S-NSSAI or if more than one S-NSSAI, verifies the provided S-NSSAIs and if they are part of the allowed S-NSSAI provided by the AMF to the UE at registration, then it proceeds to sending the message to the SMSF.

If the NAS message includes only one SMSF, then the AMF sends the NAS message to the corresponding activated SMSF in the registration. If the NAS message includes more than one allowed S-NSSAI, then the AMF determines if one or more SMSF are activated for the allowed S-NSSAI. Obviously, if it is one SMSF, the AMF proceeds to deliver the SMS to the SMSF for subsequent delivery. If more than one SMSF is activated for the allowed S-NSSAIs provided by the UE in the NAS message, then the AMF may select one SMSF to which it forwards the SMS message. The selection is based on a priority or a preference scheme or a status of a given SMSF (temporarily unavailable, load, etc.).

Mobile Terminated SMS on a Network Slice

When the network receives an SMS to be delivered to a UE registered on one or more allowed S-NSSAI, the following example procedures can be used:

The network, i.e., SMS-GW/Message center/Interworking SMS or similar receives the SMS message for the UE. The SMS-GW/Message center/Interworking SMS or similar is referred to as SMS-GW for simplicity. There are multiple SMS-GWs in the network.

In the current art, the UDM configures each SMS GW with an SMSF so the messages received at the SMS GW are delivered over the corresponding SMSF to the UE. That configuration in the UDM is static. There may be multiple SMS-GWs configured for the same SMSF. But one SMS-GW is not configured with multiple SMSFs.

The SMS GW queries the UDM for routing information, i.e., queries for the SMSF that is activated for the UE for subsequent delivery to the UE. A number of scenarios are presented:

If only one SMSF is activated for the UE over one or more allowed S-NSSAI, and that SMSF corresponds to the SMSF configured for the SMS-GW, then the UDM provides the routing information comprising the SMSF identifier to the SMS-GW, which uses the information to deliver the SMS to the SMSF as such identified. When the SMSF receives the SMS message, it queries the AMF for UE reachability and indicates the one or more allowed S-NSSAI that share the same SMSF. When the AMF receives the UE reachability query that includes one S-NSSAI, it determines the UE reachability over that SNSSAI, and sends the response to the SMSF. If reachable, the AMF receives the SMS message and delivers it to the UE, and if not reachable, the SMSF delivers the status of non-reachability to the SMS-GW.

If only one SMSF is activated for the UE over one or more allowed S-NSSAI, and that SMSF corresponds to the SMSF configured for the SMS-GW, then the UDM provides the routing information comprising the SMSF identifier to the SMS-GW, which uses the information to deliver the SMS to the SMSF as such identified. The SMS GW may also receive as part of the routing information, the one or more S-NSSAI for the SMSF. When the SMSF receives a message containing the SMS to deliver from the SMS GW, the message containing the SMS may also contain the one or more S-NSSAI as received from the UDM. The SMSF queries the AMF for UE reachability and indicates the one or more allowed S-NSSAI that share the same SMSF. Alternatively, the SMSF can select on S-NSSAI over which the SMS should be delivered. When the AMF receives the UE reachability query from the SMSF that includes one S-NSSAI, it determines the UE reachability over that SNSSAI and sends the response to the SMSF. The response may also include the allowed S-NSSAI where the UE has been found reachable. If UE is reachable, the AMF receives another message containing the SMS message from the SMSF and delivers the SMS to the UE over NAS, and if UE is not reachable, the SMSF delivers the status of non-reachability to the SMS-GW as indicated by the AMF. If on the other hand, the AMF receives the UE reachability request from the SMSF containing more than the one allowed S-NSSAI for the UE, the AMF determines if the UE is connected or idle. If the UE is connected over any one of the received S-NSSAI, the AMF indicates to the SMSF that the UE is reachable and may include the S-NSSAI over which the UE is reachable. The AMF may also include the access type (i.e., 3GPP and/or non-3GPP) for that S-NSSAI. If the UE is idle, the AMF could select one S-NSSAI (or may be a subset of S-NSSAI from the allowed S-NSSAIs) and initiate paging of the UE over the assigned resources for the slice(s), or it may initiate paging over all the resources assigned for the network slices corresponding to the one or more allowed S-NSSAI received from the SMSF, i.e., AMF does not select the S-NSSAI for reachability. If the AMF selects an S-NSSAI (or a subset of S-NSSAIs) to determine reachability, it may use criteria such as access type preference or last known used S-NSSAI.

Figure 6:
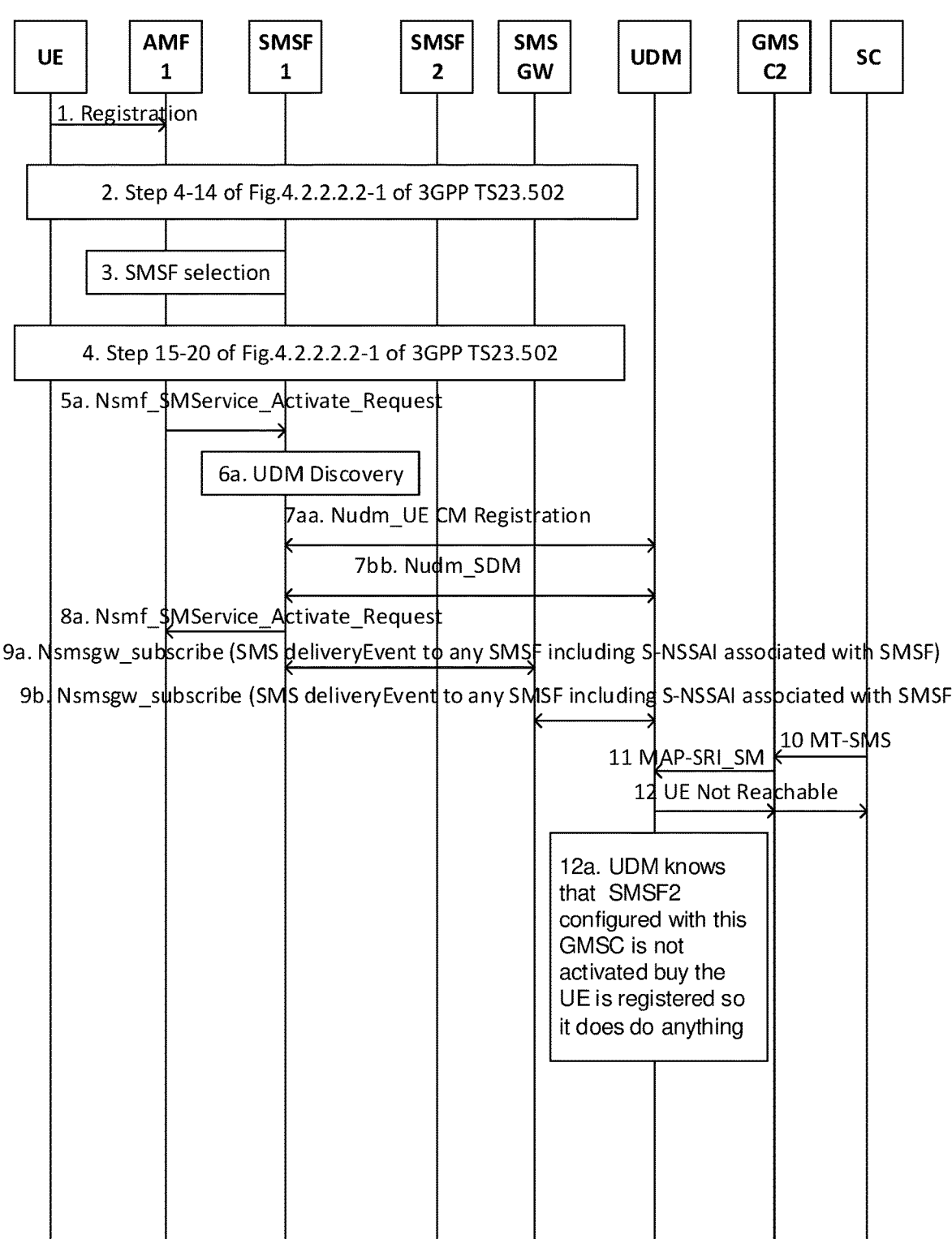
FIG. 6 is a flow diagram illustrating more detail call flow of a registration and SMS delivery according to one embodiment of the present disclosure.
Figure 6:
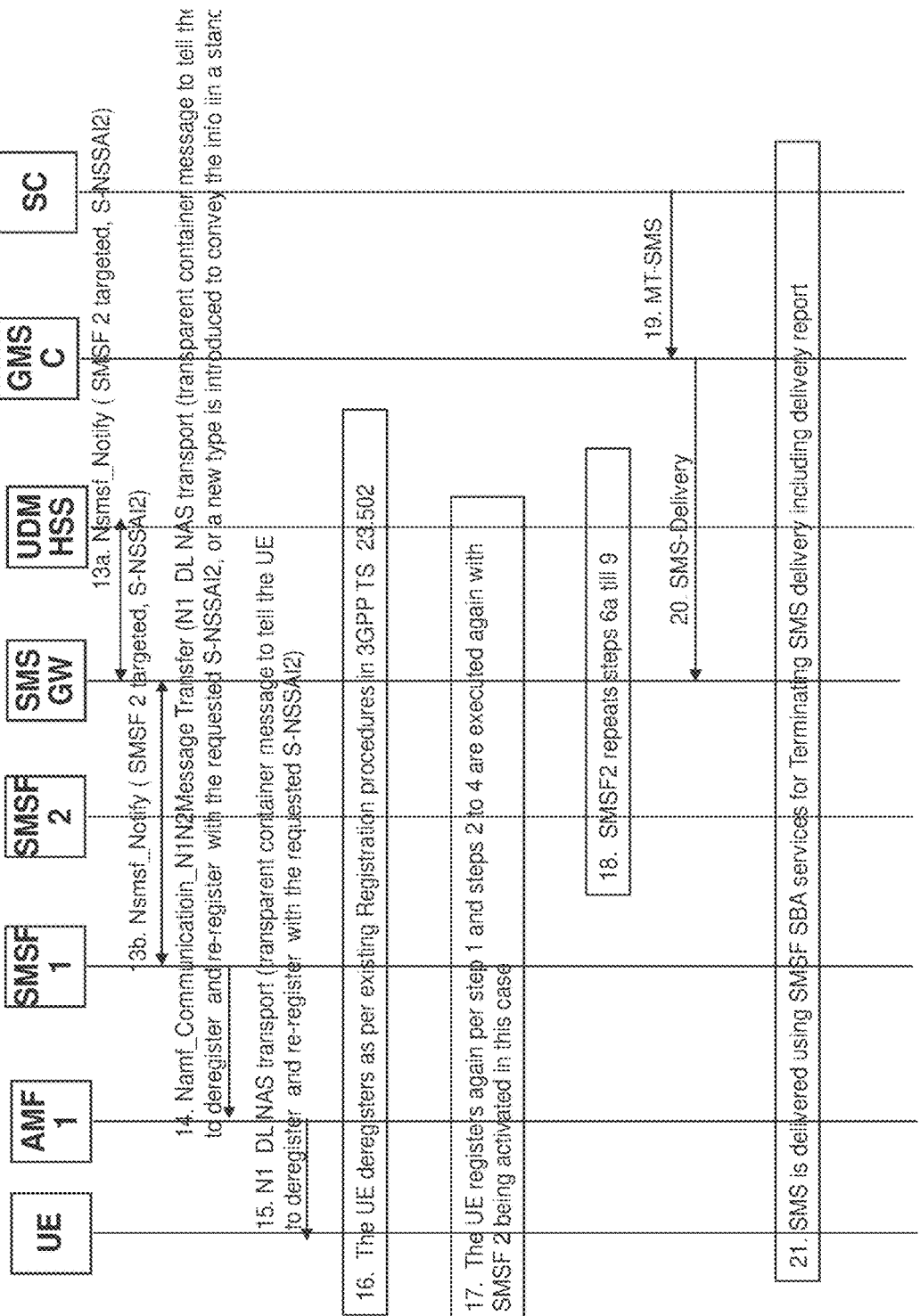
Figure 6A:
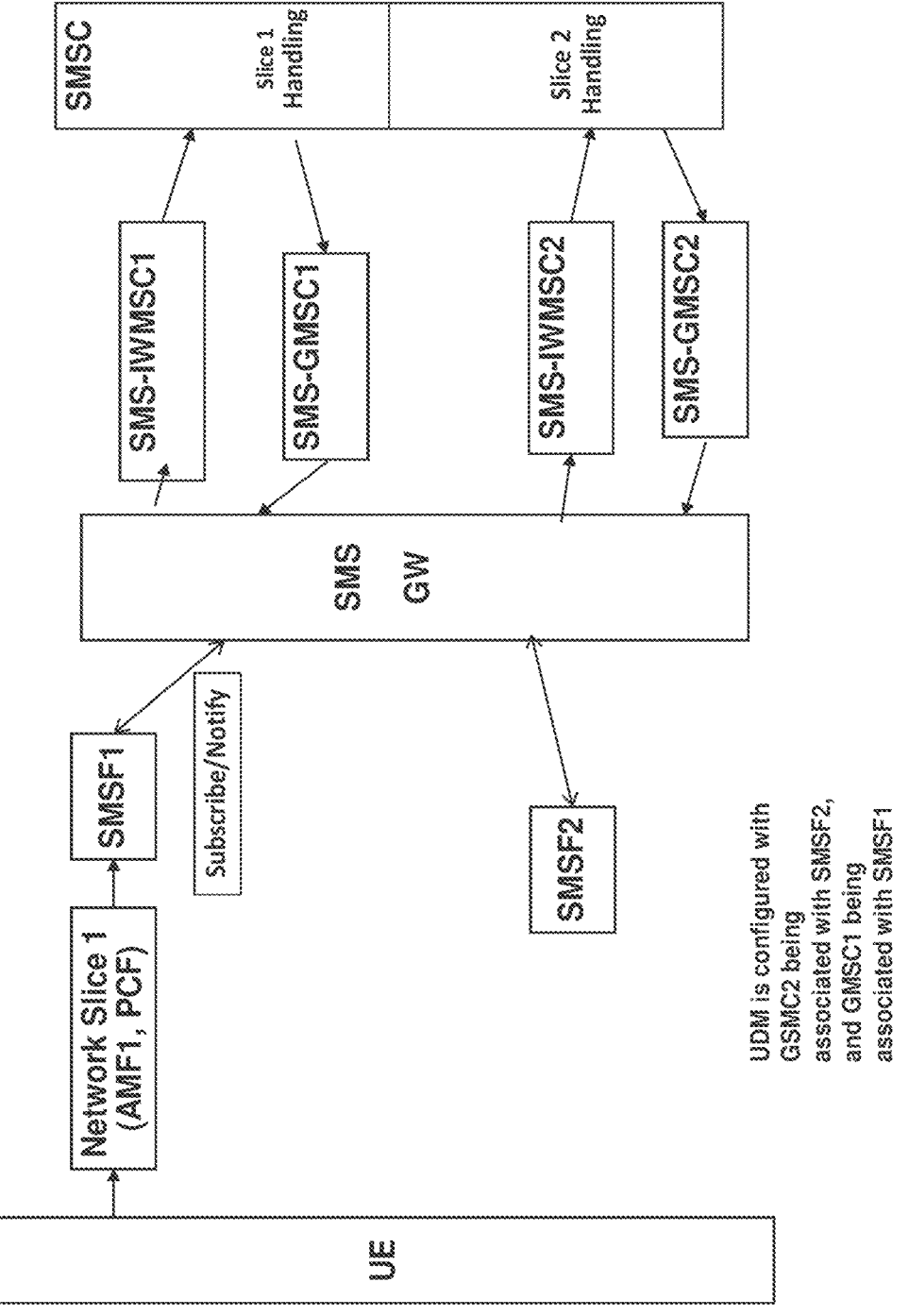
FIGS. 6a-6c illustrate examples SMS delivery in an SMS per network slice in accordance with some embodiments.
Figure 6B:
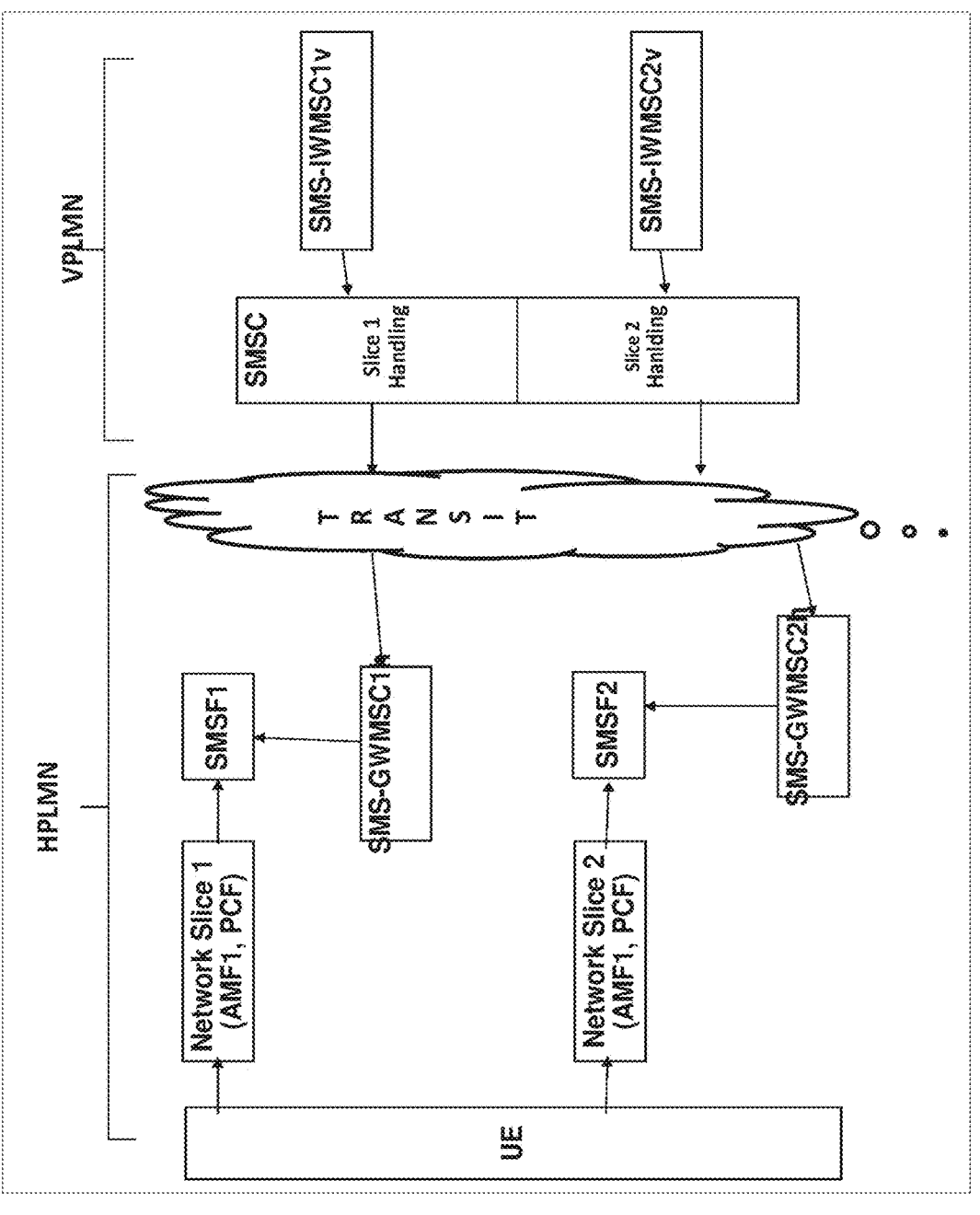
Figure 6C:
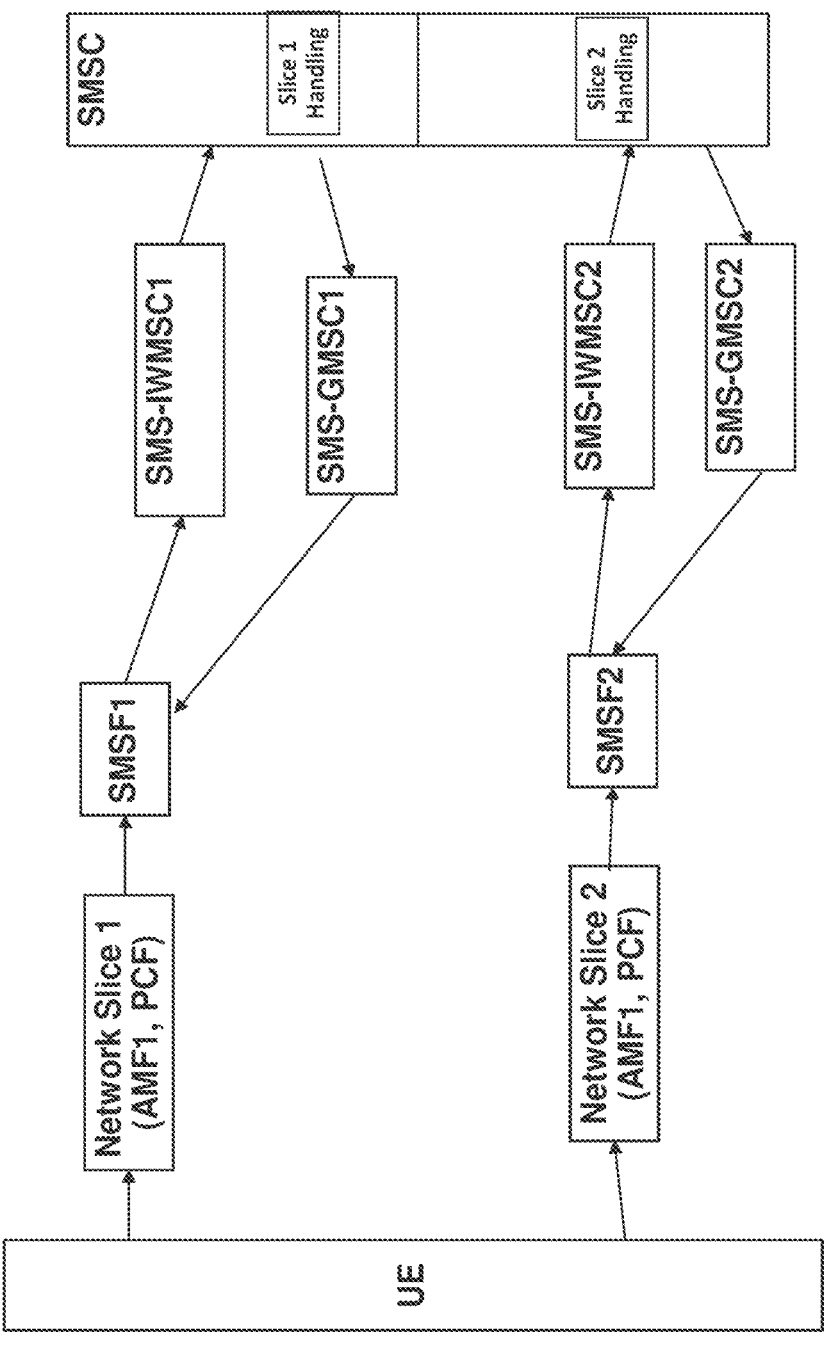

FIG. 6 illustrates an example call flow for registration for SMS and SMS delivery in case of single SMSF out of many is activated in accordance with some embodiments while FIGS. 6a, 6b and 6c provide more illustrative details for SMS delivery for a network slice. FIG. 6, and FIGS. 6a-6c show that upon receiving a routing information request from the SMS-GW for delivery of an incoming SMS to the UE, the UDM determines that only one SMSF is activated for the UE over one S-NSSAI, and that SMSF1 is the only SMSF activated at UE registration, as shown in FIG. 6. The configuration in UDM indicates that SMSF1 is not configured for the SMS-GW that is requesting the routing information. Instead the SMS-GW is configured with SMSF2 on S-NSSAI2, but SMSF2 has not been activated. The UDM can notify the SMS-GW that the UE is not reachable at this time with its configured SMSF, i.e. SMSF2 and provides the identity of SMSF2 and corresponding S-NSSAI2 and optionally the UDM can also provide the identity of the activated SMSF, i.e., SMSF1. The notification from the UDM to the SMS-GW is a result of a previous subscription by the SMS-GW to such event notification, i.e., subscription to the event notifying the SMS-GW that the UE is not reachable on SMSF2 (e.g., SMSF2 it is not activated by the AMF for the UE).

Alternatively, if the SMS-GW has received a subscription from SMSF1, at the SMSF activation, indicating that SMSF1 subscribes to SMS delivery notification event for any SMSF (including SMSF2) and its corresponding S-NS-SAI, then, in the event the SMS-GW has received an SMS to be delivered to the UE but the SMSF2 configured for the SMS GW is not activated, then the SMS-GW, after receiving the notification from the UDM (as described above) indicating UE is currently not reachable over SMSF2, the SMS GW notifies SMSF1 of the SMS message pending to be delivered to the UE on S-NSSAI2 via SMSF2. The SMSF1 instructs the AMF to either:

1. Update the configuration in the UE to allow the UE on S-NSSAI2 and to activate SMSF2.
2. Notify the UE to deregister from S-NSSAI1 and to register to S-NSSAI2. Once the UE is registered to S-NSSAI2, the AMF activates the SMSF2 as per previous procedure. FIG. 6 illustrates only option 2, but option 1 provides a straightforward approach.

Once SMSF2 is activated by the AMF, the UDM is updated by SMSF2, which then notifies the SMS-GW. The SMS-GW then contacts the SMSF2 to deliver the SMS message to the UE on S-NSSAI2 as described above.

Another example or alternative to what is described in FIG. 6 or FIGS. 6a to 6c is to simply change the configuration in UDM. Instead of having one SMSF configured with an SMS-GW, the UDM should simply provide the SMSF identity of the activated SMSF for the UE. In other words, the configuration can be made dynamic instead of static configuration as per the current art. The number of SMSFs are limited and any SMS-GW can be provided with routing information of any SMSF that is activated from the group of SMSF.

FIG. 7 illustrates example of a method in AMF and its variants. Step 500, the AMF executes the step of receiving a registration request from a UE or a wireless device, the registration request indicates that it is a registration for SMS. The registration request may include requested NSSAI which may comprise one or more requested S-NSSAI. Alternatively, the UE may select to register only for one S-NSSAI when the registration request is for SMS, in which case the requested NSSAI includes only one S-NSSAI.

At step 502, the AMF obtains the subscription data and may also obtain the UE context in SMSF indicating for each subscribed/allowed S-NSSAI the SMSF identity of the SMSF that can be activated for SMS. The UE context in SMSF may be obtained from the UDM together with the subscription data. However, UE context for SMSF may also be obtained from the policy function or locally from the local PCF or configured in the AMF. The subscription data may include subscribed NSSAI which include one or more S-NSSAI. If the UE has requested registration to only one S-NSSAI for SMS registration, then the AMF may check if the requested S-NSSAI is included in the subscribed NSSAI for SMS. If the requested NSSAI is not included in the subscribed NSSAI, the AMF may either reject the registration request if configured to do so. Else, the AMF may provide in the registration response (at step 508) the allowed NSSAI for SMS based on the subscribed NSSAI (and optionally PLMN supported NSSAI) and where the allowed NSSAI includes only one allowed S-NSSAI if the subscribed NSSAI/PLMN NSSAI support only one active NSSAI per registration for SMS. Alternatively, the allowed NSSAI included in the registration response to the UE would include one or more allowed S-NSSAI for SMS.

Back to step 504, the AMF determines the allowed NSSAI for SMS based on the received subscription data and may take into account the PLMN supported NSSAI especially in a roaming situation. Note that in the current art, subscribed NSSAI is used for normal registration and Packet Data Unit (PDU) session establishment as described in 3GPP TS 23.501 V. 16.2.0. The subscribed NSSAI for SMS as described herein may be the same as the subscribed NSSAI for a normal registration used for PDU sessions or the subscribed NSSAI for SMS may be a different set of subscribed NSSAI. The allowed NSSAI comprises one or more allowed S-NSSAI for the SMS. In one implementation, as described above, only one allowed S-NSSAI should be allowed at a time for SMS, in which case the S-NSSAI may either be selected by the AMF or by the operator, via UDM or PCF or pre-configuration.

At step 506, the AMF selects one or more SMSF to activate if one or more SMSF are associated to one or more allowed S-NSSAI. Note that there may be one SMSF associated with all the allowed S-NSSAI or to a subset of S-NSSAI, where a subset of S-NSSAI may include only one S-NSSAI. Of course, if the AMF is configured to only allow one S-NSSAI for SMS for the UE registration, the AMF determines only one SMSF for the S-NSSAI to activate. The AMF selecting the one or more SMSF could be based on an obtained UE context in SMSF, and that indicates the assigned SMSF for the UE for the one or more allowed or subscribed S-NSSAI (i.e., one to one SMSF to S-NSSAI or one to many SMSF to S-NSSAI). The UE context in SMSF for the one or more subscribed S-NSSAI may be obtained from the UDM, PCF or NRF.

At step 508, the AMF sends a registration response for SMS to the UE, where the registration response includes the allowed NSSAI for SMS. The allowed NSSAI includes one or more S-NSSAI for SMS.

At step 510 which may occur at any time before or after step 508, the AMF sends an activation message to one or more SMSF belonging to the one or more allowed S-NSSAI as determined. Alternatively, the AMF may activate one SMSF for only one allowed S-NSSAI if only one S-NSSAI is requested for SMS registration or if one SMSF is configured for all the allowed S-NSSAI. The activation message indicates at least the identity of the core network entity, i.e., AMF, and an identity of the wireless device.

Subsequent to UE registration for SMS, the UE may initiate sending an SMS. In MO SMS delivery, the AMF, upon receiving from the registered UE, a NAS message comprising a short message service message (SMS message) and one of the allowed S-NSSAI provided in the registration response message at step 508, the AMF executes the step of determining based on the allowed S-NSSAI the corresponding SMSF that was previously activated and then forwarding the SMS message to the determined SMSF. If the UE includes an S-NSSAI with the NAS message that was not part of the received allowed S-NSSAI in the registration response, but the included S-NSSAI is determined by the AMF to be an allowed S-NSSAI, the AMF determines if the corresponding SMSF for the received S-NSSAI is activated and if not, it activates the SMSF if different from the already activated SMSF and forwards the SMS message to the newly activated SMSF. Note that the activation may also include the SMS message received from the UE to optimize the signaling.

For MT SMS delivery, the AMF executes the step of receiving a request message from the SMSF to determine reachability of the wireless device over any one of the one or more allowed or subscribed S-NSSAI if the allowed S-NSSAI are the same as allowed S-NSSAI.

If the request includes more than one S-NSSAI over which the AMF has to determine reachability, the AMF executes the step of determining the reachability of the UE over a selected S-NSSAI if more than one allowed S-NSSAI is associated with the UE. The selection of the S-NSSAI depend on many factors including the UE status. If the UE is connected, the AMF selects the S-NSSAI over which the UE is connected (PDU session active). The AMF indicates to the SMSF that the UE is reachable and connected. The AMF may also provide to the SMSF the S-NSSAI over which the UE is reachable and connected and may indicate the access type as well. The AMF then receives from the SMSF the SMS message for delivery to the UE on the selected S-NSSAI where UE reachability is detected. If the UE is idle, the AMF may select one S-NSSAI over which it determines reachability, where the selection may be based on the access type or last UE activity, or other policy-based criteria. The AMF then pages the UE over the resources associated to the selected S-NSSAI. The AMF may also attempt to page the UE over the resources associated to the S-NSSAIs provided in the reachability request. Once the UE responds to the page on a resource assigned to one of the S-NSSAI, the AMF responds to the SMSF indicating the S-NSSAI over which the UE is now reachable.

If on the other hand, the request for reachability from the SMSF includes one specific S-NSSAI (e.g., S-NSSAI2) over which reachability of the UE has to be determined, but the UE is provided one allowed S-NSSAI (S-NSSAI1) in the registration response that is different from the S-NSSAI received in the reachability request from the SMSF, then the AMF can perform one of the following implementation alternatives:

1. Update the configuration in the UE to allow the UE on S-NSSAI2 and to activate SMSF2 if S-NSSAI2 is determined to be an allowed S-NSSAI.
2. Notify the UE to deregister from S-NSSAI1 and to register to S-NSSAI2. Once the UE is registered to S-NSSAI2, the AMF activates the SMSF2 as per previous procedure. FIG. 6 illustrates only option 2, but option 1 may be more straightforward.

FIG. 8 describes example methods in one SMSF. If more than one SMSF is selected by the AMF, the example methods herein is performed by each of the SMSF. At step 600, one or more SMSFs in a PLMN registers its profile with a NRF, where the profile includes the SMSF identity and the supported one or more S-NSSAI by the SMSF.

Not shown in FIG. 8, an SMSF receives an activation message from the AMF when the UE is registered for SMS. The activation may include one or more allowed S-NSSAI for the UE if the SMSF supports one or more S-NSSAI. The SMSF for the one or more S-NSSAI registers with the UDM using Nudm_UECM_Registration with Access Type. As a result, the UDM stores the following information for a UE: S-NSSAI, SMSF identity, SMSF address, Access Type in UE Context in SMSF data.

In one example, the SMSF may subscribe to the SMS-GW to be notified in the event the SMS-GW has an SMS delivery to the UE but the SMS GW fails to reach its configured SMSF. In this case, SMSF can be notified by the SMS-GW (or the NEF) that in the event the SMS-GW has received an SMS to be delivered to the UE but the SMSF configured for the SMS GW is not activated (e.g., SMSF2), then the SMS-GW notifies SMSF of the SMS message pending to be delivered to the UE via SMSF2 on S-NSSAI2. Upon receiving that notification, SMSF instructs the AMF about the pending SMS delivery on S-NSSAI2 via SMSF2 and where the AMF can make the UE reachable over S-NSSAI2 and activate SMSF2. When the SMSF receives from the AMF that the UE is reachable over SMSF2, the SMSF may notify the SMS-GW, which would then deliver the SMS message via SMSF2. SMS-GW may also be notified via SMSF2 or even via UDM.

Back to FIG. 8, step 602, the SMSF receives an SMS message for delivery to the UE via AMF. At step 604, if the SMS entity is allocated to one or more allowed S-NSSAI, the SMSF execute the step of determining the user equipment (UE) reachability on one or more of the allowed S-NSSAI and sends the UE reachability instruction to the AMF comprising the one or more S-NSSAI associated with the SMSF. At step 606, if the SMSF receives an indication of reachability of the user equipment on one of the one or more allowed S-NSSAI, sending the SMS message towards the UE via the AMF and may indicate the allowed S-NSSAI over which the UE was found reachable.

In another implementation of step 604, the SMSF may send the UE reachability instruction that further comprises one selected S-NSSAI from the one or more S-NSSAI assigned for the SMSF and only requests reachability of the UE to be determined on the selected S-NSSAI and if the SMSF receives an indication that the UE is not reachable over the selected S-NSSAI, the SMSF may select another S-NSSAI if allocated to the SMSF and sends to the AMF a reachability request of the user equipment over the other selected S-NSSAI.

In another implementation of step 602, the step of receiving an SMS message for delivery further comprises receiving an allowed S-NSSAI for which reachability of the UE is to be determined. If the SMSF receives an indication that the UE is not reachable over the received allowed S-NSSAI, the SMSF notifies the originator of the SMS message (SMS-GW) that the SMS is not deliverable over the received S-NSSAI.

FIG. 9 illustrates example methods on a UE or wireless device. At step 880, the UE executes the step sending a Registration Request message indicating that the registration is for Short message service, SMS, or an indication that the wireless device supports SMS delivery over NAS. The registration request message may comprise requested Network slice identifier (NSSAI) that comprises one or more requested S-NSSAI. At step 882, the UE then executes the step of receiving a registration response comprising the allowed NSSAI for SMS service by the network, wherein the allowed NSSAI comprises one or more S-NSSAI the UE is allowed to use for SMS.

When the UE needs to send an SMS, the UE, at step 884, first executes the step of determining an S-NSSAI from the allowed NSSAI received from the network, and at step 886, the UE executes the step of sending a NAS message to a network entity (AMF) via base station, and where the NAS message comprises the short message (SMS) and the determined S-NSSAI from the allowed NSSAI provided in the registration response.

The UE may also, at any time be configured to add, replace, or remove one or more allowed S-NSSAI to be used for the SMS service.

Another example is for the UE to receive an instruction to deregister from an S-NSSAI for SMS and/or to register to another S-NSSAI, in which case the UE may then deregister and/or register indicating the other S-NSSAI as a requested S-NSSAI.

Other example methods executed at the UDM is provided. The UDM can be modified to store SMSF and SMS related data on a per S-NSSAI. The following data is provided per S-NSSAI in support of the embodiments herein:

| | SMS Subscription data contains one or more S-NSSAI level subscription data: | |
|---|---|---|
| | S-NSSAI | Indicates the value of the S-NSSAI |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.) is defined in TS 32.421 [39]. This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non-3GPP access through this SMSF |

In addition, the UDM may also configure multiple SMSF for an SMS GW if multiple SMSF are activated by the AMF at UE registration for SMS and the UE is allowed multiple S-NSSAIs for SMS. If multiple SMSF registered for the UE are dynamically configured for an SMS GW at the UDM, then upon receiving a routing information request from the SMS GW for SMS delivery to the UE, the UDM responds to the SMS GW by providing the list of SMSF or can select only one SMSF from the activated SMSF for delivery of the SMS and provide it to the SMS GW. If the SMS GW belongs to one specific slice (i.e., S-NSSAI), the SMS GW may include that information to the UDM, and the UDM may provide the corresponding SMSF on the same network slice (same S-NSSAI) as the SMS-GW.

If the UDM configures one SMSF for one SMS-GW, and the UDM receives a routing information request from an SMS GW configured with an SMSF (SMSF2 on S-NSSAI2) that is not activated for the UE, the UDM may after checking the data determine that another SMSF (SMSF1 on an S-NSSAI) is instead registered as activated in the UDM. However, the configuration in UDM indicates that SMSF1 is not configured for the SMS-GW that is requesting the routing information. The UDM can notify the SMS-GW that the UE is not reachable at this time with its configured SMSF2 and provides to the SMS GW the identity of SMSF2 and corresponding S-NSSAI2 that is presently not reachable and optionally the UDM provides the identity of the activated SMSF, e.g., SMSF1, where the UE may be reachable. This special notification may be sent to the UDM as a result of a prior received subscription to the notification by the SMS GW, or it may send it in the response to the request to routing information where the request may indicate the SMS GW support receiving the notification information.

Figure 10:
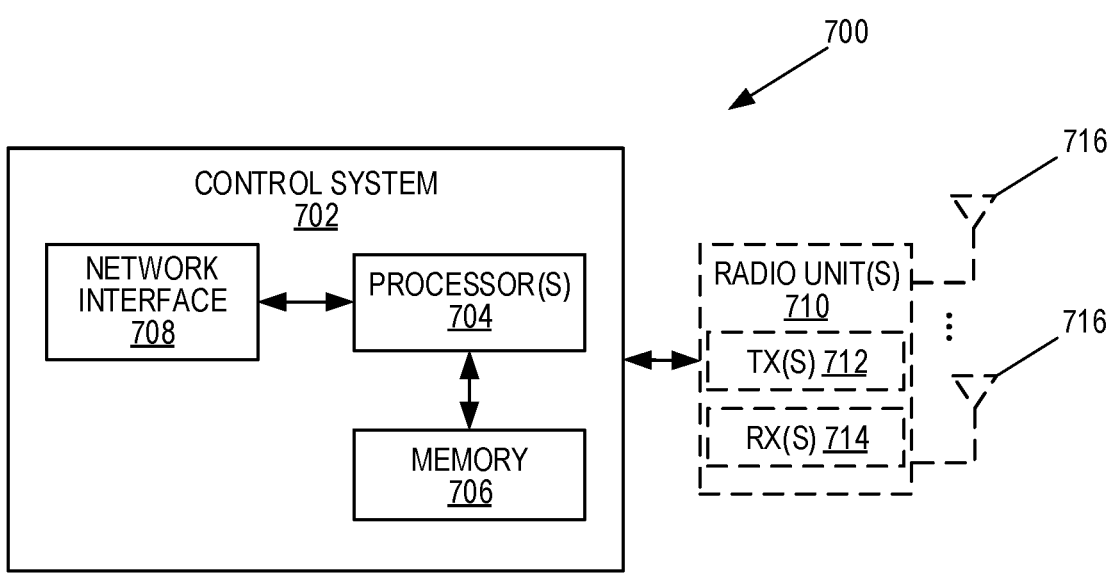
FIG. 10 is a schematic block diagram of a network node, according to one embodiment of the present disclosure.

FIG. 10 is a schematic block diagram of a network node 700 according to some embodiments of the present disclosure. The network node 700 may be, for example, a radio access node, such as a base station 202 or 206, or a core network node, such as those illustrated in FIGS. 3 and 4. As illustrated, the network node 700 includes a control system 702 that includes one or more processors 704 (e.g., Central Processing Units (CPUs), Application Specific Integrated Circuits (ASICs), Field Programmable Gate Arrays (FP-GAs), and/or the like), memory 706, and a network interface 708. The one or more processors 704 are also referred to herein as processing circuitry.

In addition, if the network node 700 is a radio access node, for example, it may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a network node 700 as described herein. In some embodiments, the function(s) are implemented in software that is stored, e.g., in the memory 706 and executed by the one or more processors 704.

Figure 11:
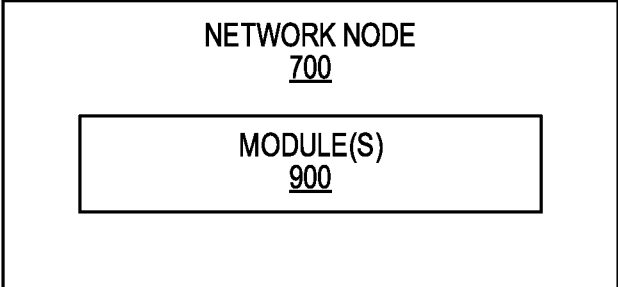
FIG. 11 is a schematic block diagram of a network node, according to another embodiment of the present disclosure.

FIG. 11 is a schematic block diagram that illustrates a virtualized embodiment of the network node 700 according to some embodiments of the present disclosure. This discussion is equally applicable to other types of network nodes. Further, other types of network nodes may have similar virtualized architectures.

As used herein, a "virtualized" radio access node is an implementation of the network node 700 in which at least a portion of the functionality of the network node 700 is implemented as a virtual component(s) (e.g., via a virtual machine(s) executing on a physical processing node(s) in a network(s)). As illustrated, in this example, the network node 700 includes the control system 702 that includes the one or more processors 704 (e.g., CPUs, ASICs, FPGAs, and/or the like), the memory 706, and the network interface 708 and, optionally, the one or more radio units 710 that each includes the one or more transmitters 712 and the one or more receivers 714 coupled to the one or more antennas 716, as described above. The control system 702 may be connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the network node 700 described herein are implemented at the one or more processing nodes 800 or distributed across the control system 702 and the one or more processing nodes 800 in any desired manner. In some particular embodiments, some or all of the functions 810 of the network node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
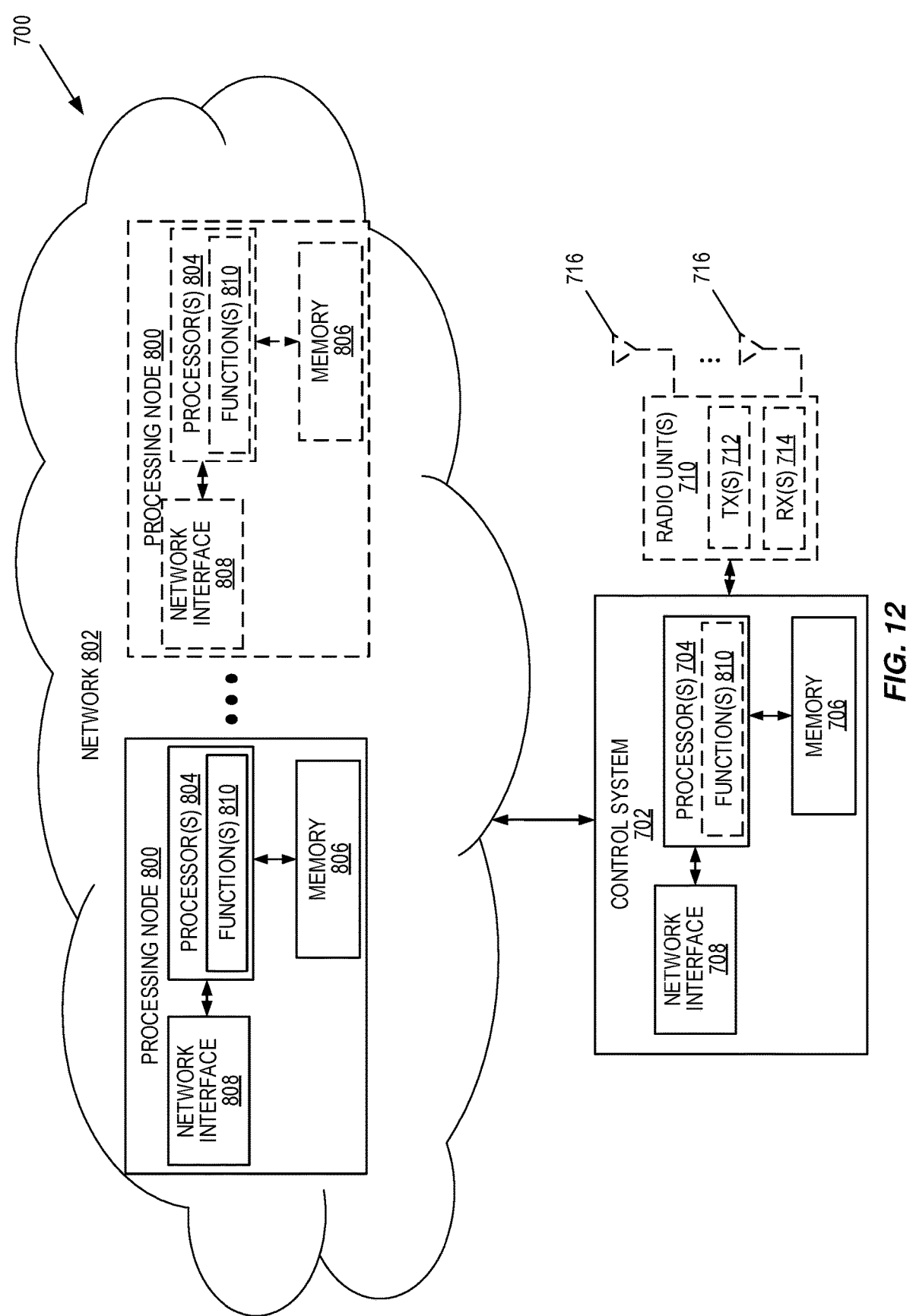
FIG. 12 is a schematic block diagram illustrating a virtualization environment in which functions implemented by some embodiments of the present disclosure may be virtualized.

FIG. 12 is a schematic block diagram of the network node 700 according to some other embodiments of the present disclosure. The network node 700 includes one or more modules 900, each of which is implemented in software. The module(s) 900 provide the functionality of the network node 700 described herein, e.g., AMF, SMSF, UDM, SMS-GW). This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 13:
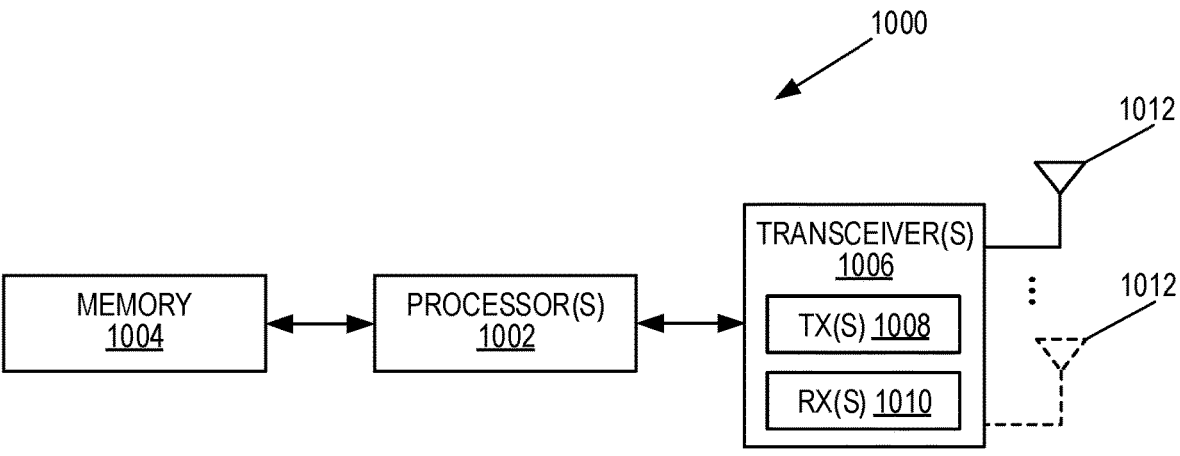
FIG. 13 is a functional block diagram of an end device, such as a UE, configured according to one embodiment of the present disclosure.

FIG. 13 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 described above may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
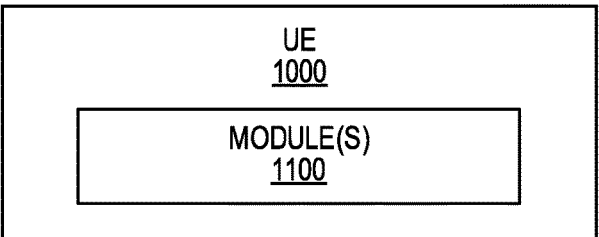
FIG. 14 is a functional block diagram of an end device, such as a UE, configured according to another embodiment of the present disclosure.

FIG. 14 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 15:
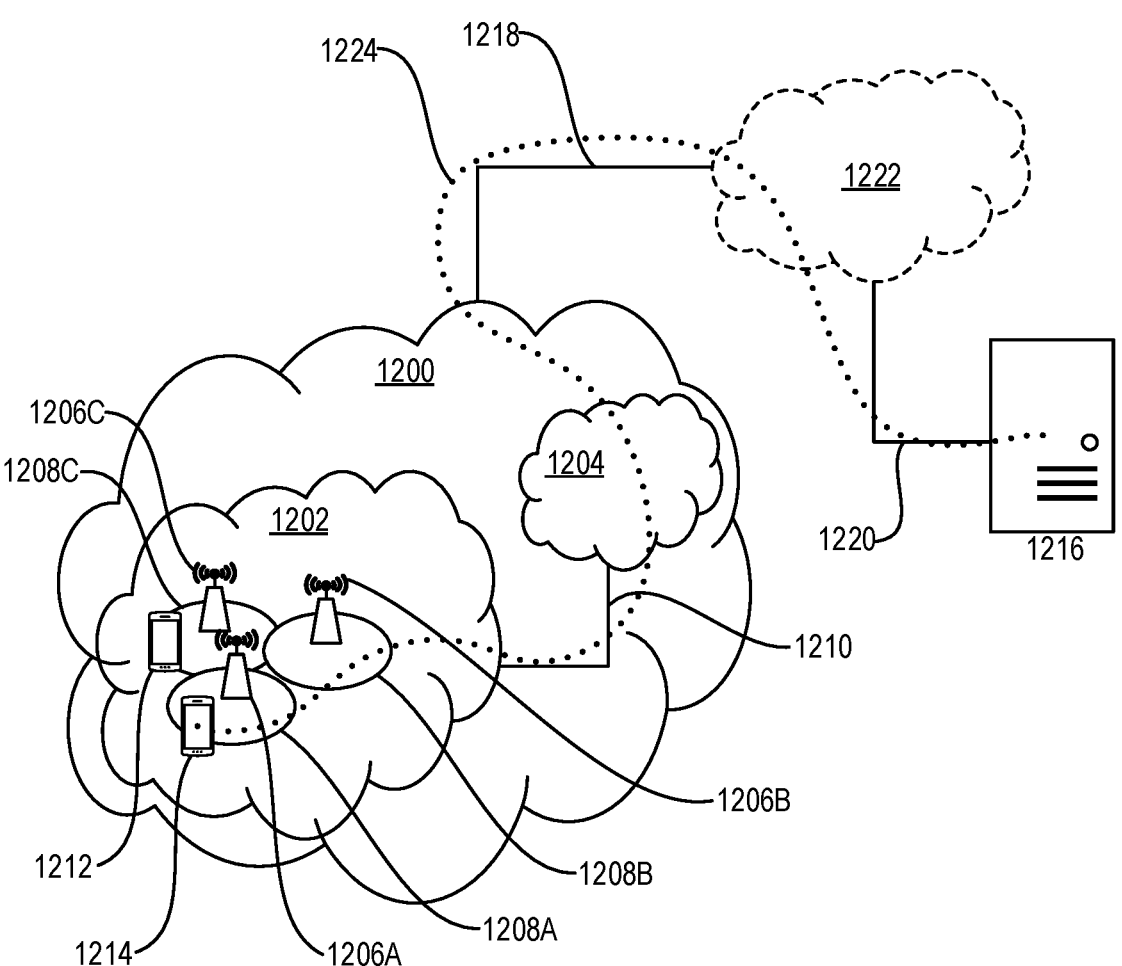
FIG. 15 illustrates an exemplary wireless network according to one embodiment of the present disclosure.

FIG. 15 illustrates a telecommunication network according to some embodiments of the present disclosure. With reference to FIG. 15, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 1206C, such as Node Bs, eNBs, gNBs, or other types of wireless Access Points (APs), each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 15 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Figure 16:
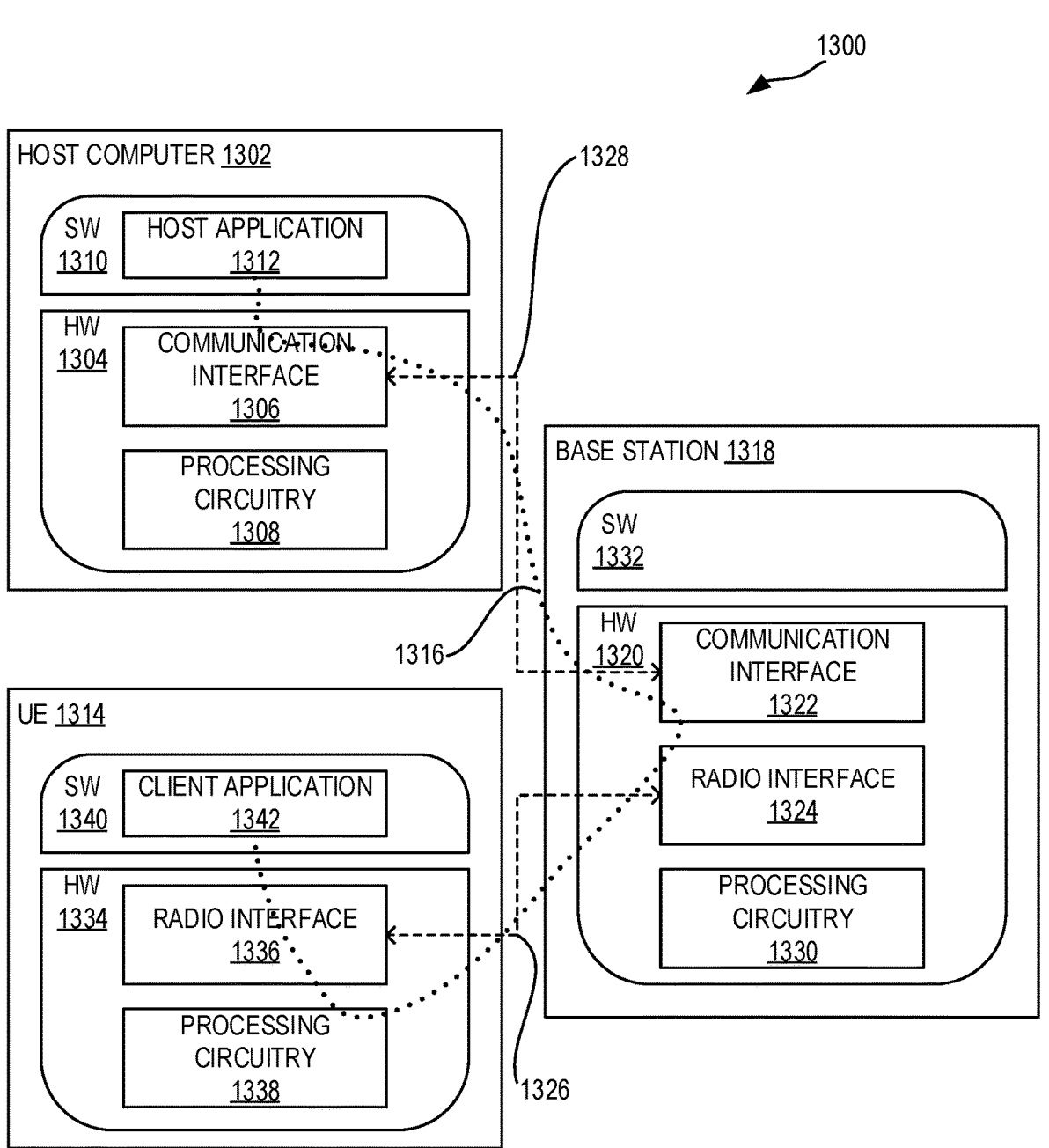
FIG. 16 illustrates a host computer communicating via a base station with a UE over a partially wireless connection in accordance with some embodiments of the present disclosure.

FIG. 16 illustrates a communication system according to some embodiments of the present disclosure. Example implementations, in accordance with an embodiment, of the UE, base station, and host computer discussed in the preceding paragraphs will now be described with reference to FIG. 16. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

It is noted that the host computer 1302, the base station 1318, and the UE 1314 illustrated in FIG. 13 may be similar or identical to the host computer 1216, one of the base stations 1206A, 1206B, 1206C, and one of the UEs 1212, 1214 of FIG. 12, respectively. This is to say, the inner workings of these entities may be as shown in FIG. 13 and independently, the surrounding network topology may be that of FIG. 12.

In FIG. 16, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may provide for the ability to measure data usage in terms of packets and thereby provide benefits such as enhance the system's ability to derive a proper traffic model in the mobile network, which is vital for dimensioning and deployment.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1318, and it may be unknown or imperceptible to the base station 1318. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

Figures 17, 18:
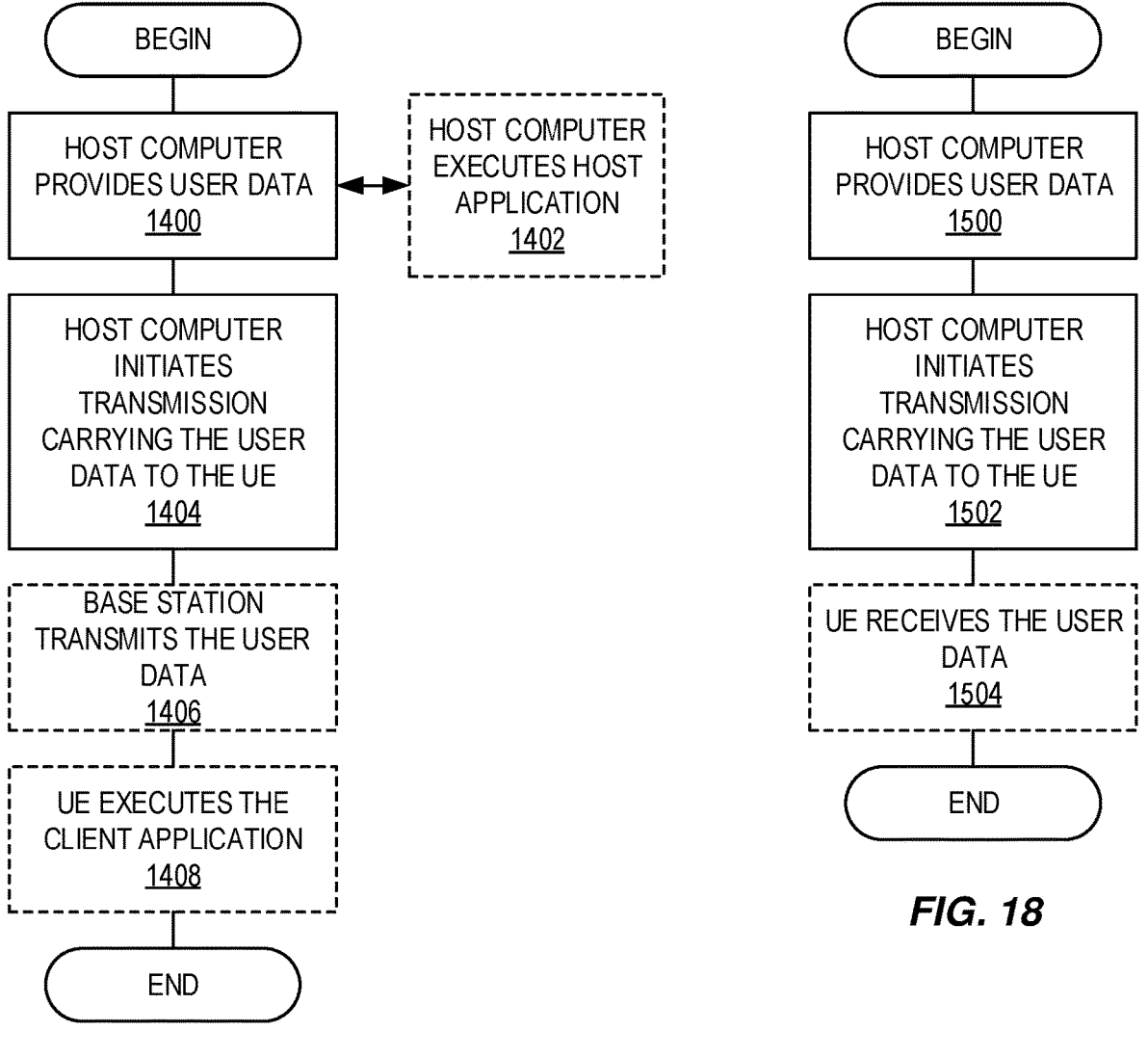
FIG. 17 is a flowchart illustrating a method implemented in a communication system, in accordance with one embodiment.
FIG. 18 is a flowchart illustrating a method implemented in a communication system, in accordance with one embodiment.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

Figures 19, 20:
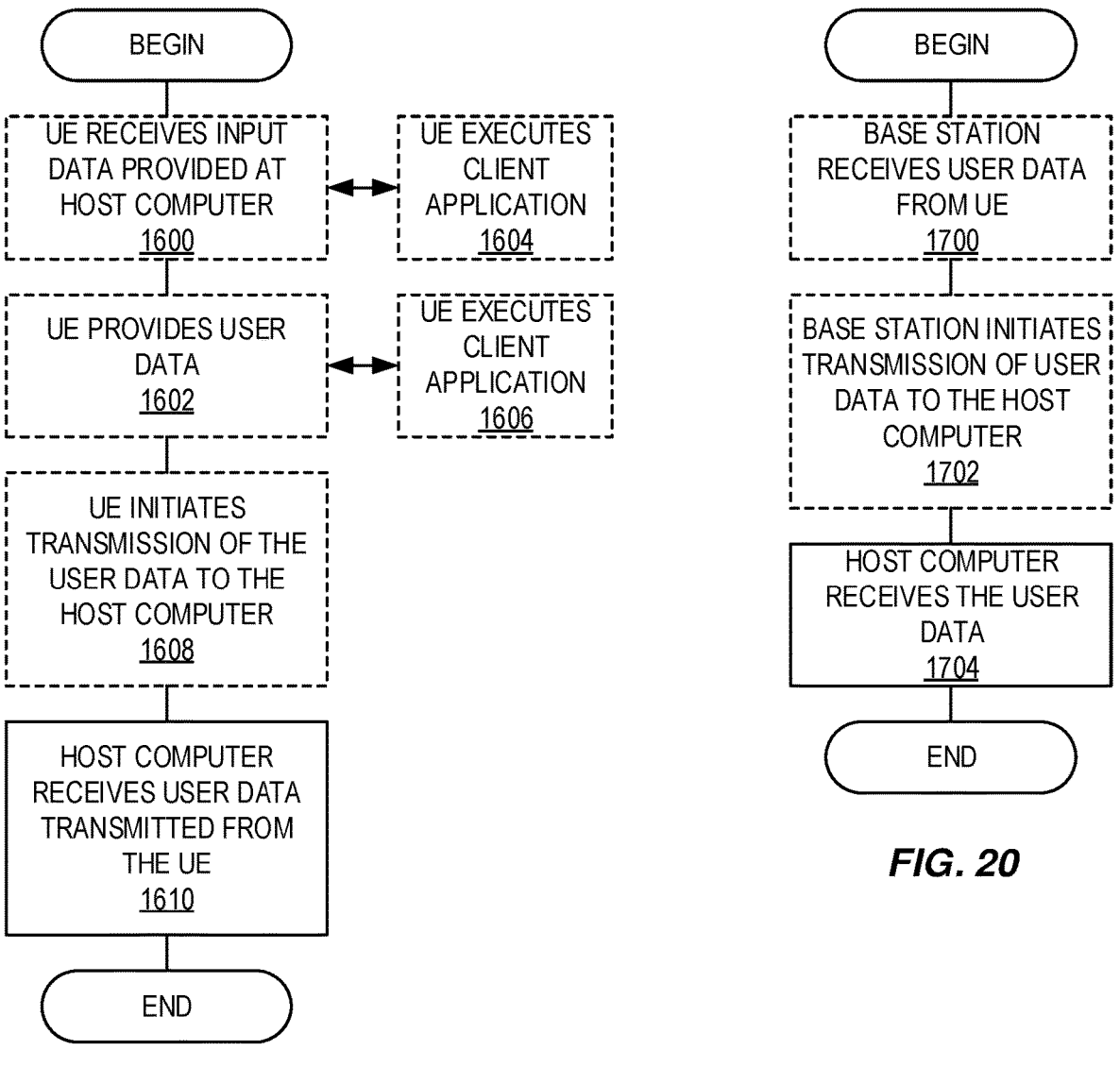
FIG. 19 is a flowchart illustrating a method implemented in a communication system, in accordance with one embodiment.
FIG. 20 is a flowchart illustrating a method implemented in a communication system, in accordance with one embodiment.

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1600 (which may be optional), the UE receives input data provided by the host computer. Additionally, or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 20 will be included in this section. In step 1700 (which may be optional), in accordance with the teachings of the embodiments described throughout this disclosure, the base station receives user data from the UE. In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

EMBODIMENTS

While not being limited thereto, example embodiments of the present disclosure are provided below. Note that these are merely examples and may or may not necessarily be the final embodiments.

1. UE Embodiments

1. A method performed by a wireless device, the method comprising:
    sending a registration Request message indicating that the registration is for Short message service, SMS, or an indication that the wireless device supports SMS delivery over NAS;
    receiving a registration response comprising the allowed NSSAI for SMS service, wherein the allowed NSSAI comprises one or more S-NSSAI the UE is allowed to use for SMS.

2. The method of embodiment 1 wherein the method further comprises:
    determining an S-NSSAI from the allowed NSSAI, and sending a message to a network entity comprising a short message and the determined S-NSSAI of the allowed NSSAI provided in the registration response.

3. The method of embodiment 1 wherein the registration request message comprises requested Network slice identifier (NSSAI) that comprises one or more S-NSSAI.

4. The method of embodiment 1 further comprising receiving from the network an indication to add, replace, or remove one or more allowed S-NSSAI for the SMS service.

2. CP/AMF Embodiments

5. A method performed by a core network control plane entity, the method comprising:
    receiving a registration request from a wireless device, the registration request indicating that it is a registration for SMS or that the UE supports SMS delivery over NAS;
    obtaining SMS subscription data and optionally a UE context in SMSF for the one or more subscribed S-NSSAI and where the UE context in SMSF indicates the SMSF identity for the UE;
    determining the allowed NSSAI based on the subscribed NSSAI, the allowed NSSAI comprises one or more allowed S-NSSAI for the SMS or determining and selecting the allowed NSSAI that comprises one S-NSSAI for the SMS;
    selecting one or more SMSF for the one or more allowed S-NSSAI or if one S-NSSAI is determined for SMS, selecting only the SMSF associated with the S-NSSAI;
    sending a registration response to the UE indicating the allowed NSSAI for the SMS; and
    sending to the one or more SMSF an activation message indicating at least the identity of the core network entity and an identity of the wireless device.

6. The method of embodiment 5 wherein selecting the one or more SMSF is based on UE context in SMSF, if obtained, and that indicates the assigned SMSF for the UE for the one or more allowed or subscribed S-NSSAI (i.e., one to one SMSF to S-NSSAI or one to many SMSF to S-NSSAI).

7. The method of embodiment 6 wherein the UE context in SMSF for the one or more subscribed S-NSSAI is obtained from the UDM.

8. The method of embodiment 6 wherein the UE context in SMSF for the one or more allowed S-NSSAI is obtained from at least one of a PCF, NRF or configured data.

9. The method of embodiment 5 wherein the method further comprises:
    receiving a NAS message comprising a short message service message (SMS message), the NAS message comprising one of the allowed S-NSSAI;
    determining based on the allowed S-NSSAI the corresponding SMSF; and
    forwarding the SMS message to the SMSF for the allowed S-NSSAI.

10. The method of embodiment 5 further comprising
    receiving a request message from the SMSF to determine reachability of the wireless device over any one of the one or more allowed/subscribed S-NSSAI;
    determining the reachability of the UE over a selected S-NSSAI if more than one allowed S-NSSAI is associated with the UE;
    receiving an SMS message for delivery to the UE on the selected S-NSSAI where UE reachability is detected.

11. The method of embodiment 5 further comprising
receiving an indication that an SMS is to be delivered over an S-NSSAI that is allowed/subscribed for the UE and for which the UE has not registered to or has not been provided in the registration response as one of the allowed S-NSSAI;
    instructing the UE to add the S-NSSAI into the list of allowed S-NSSAI or to register for SMS requesting the S-NSSAI;
    delivering the SMS message to the UE on the S-NSSAI.

SMSF Embodiments

12. A method performed by a Short Message Service entity, the method comprising:
  registering an SMSF profile in a network repository entity, wherein the profile comprises one or more S-NSSAI supported by the Short Message Service entity.
13. The method of embodiment 12 further comprising:
  receiving an SMS message for delivery to a user equipment;
  if the SMS entity is allocated to one or more allowed S-NSSAI determining the user equipment reachability on one or more of the allowed S-NSSAI;
  upon receiving an indication of reachability of the user equipment on one of the one or more allowed S-NSSAI, sending the SMS message towards the UE indicating the allowed S-NSSAI over which the UE is reachable.
14. The method of embodiment 13, wherein the method further comprises selecting an S-NSSAI for which reachability of the UE is to be determined.
15. The method of embodiments 13, 14 wherein upon receiving an indication that the UE is not reachable over the selected S-NSSAI, selecting another S-NSSAI if allocated to the SMSF and determining reachability of the user equipment over the other S-NSSAI.
16. The method of embodiment 13, wherein the step of receiving an SMS message for delivery further comprises receiving an allowed S-NSSAI for which reachability of the UE is to be determined.
17. The method of embodiment 16, wherein the step of determining the UE reachability on one or more of the allowed S-NSSAI corresponds to determining UE reachability on the received S-NSSAI.
18. The method of embodiments 13 and 16-17 wherein upon receiving an indication that the UE is not reachable over the received allowed S-NSSAI, notify an originator of the SMS message that the SMS is not deliverable over the received S-NSSAI.

3. Apparatus Embodiments

19. A UE or a wireless device comprising a processing circuitry and memory, the memory containing instructions executable by the processing circuitry whereby the wireless device is configured to perform any of the embodiments 1-5.
20. A UE or a wireless device adapted to perform any of the embodiments 1-5.
21. A control plane entity comprising a processing circuitry and memory, the memory containing instructions executable by the processing circuitry whereby the control plane entity is configured to perform any of the embodiments 5-11.
22. A control plane, CP, entity adapted to perform any of the embodiments 5-11
23. An SMS entity comprising a processing circuitry and memory, the memory containing instructions executable by the processing circuitry whereby the SMS entity is configured to perform any of the embodiments 12-18.
24. An SMS entity adapted to perform any of the embodiments 12-18.
25. A computer program comprising instructions which, when executed by at least one processor of a wireless device, causes the wireless device to carry out the steps of any of the UE embodiments.

26. A carrier containing the computer program of embodiment 25, wherein the carrier is one of an electronic signal, optical signal, radio signal, or computer readable storage medium.
27. A computer program comprising instructions which, when executed by at least one processor of a CP entity, causes the CP entity to carry out the steps of any of the CP/AMF entity embodiments.
28. A carrier containing the computer program of embodiment 27, wherein the carrier is one of an electronic signal, optical signal, radio signal, or computer readable storage medium.
29. A computer program comprising instructions which, when executed by at least one processor of a SMS entity, causes the SMS entity to carry out the steps of any of the SMS entity embodiments.
30. A carrier containing the computer program of embodiment 29, wherein the carrier is one of an electronic signal, optical signal, radio signal, or computer readable storage medium.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
  3GPP Third Generation Partnership Project
  5G Fifth Generation
  5GC Fifth Generation Core
  5GS Fifth Generation System
  AMF Access and Mobility Management Function
  AN Access Network
  ASIC Application Specific Integrated Circuit
  AUSF Authentication Server Function
  CP Control Plane
  CPU Central Processing Unit
  DSP Digital Signal Processor
  FPGA Field Programmable Gate Array
  gNB New Radio Base Station
  NEF Network Exposure Function
  NF Network Function
  NR New Radio
  NRF Network Function Repository Function
  NSSAI Network slice selection Assistance Instance
  NSSF Network Slice Selection Function
  PCF Policy Control Function
  PDU Protocol Data Unit
  RAN Radio Access Network
  SC Service Center
  S-NSSAI Serving-NSSAI
  SMF Session Management Function
  SMS Short Message Service
  SMSF Short message Service Function
  SMS-GW Short message service gateway
  TS Technical Specification
  UDM Unified Data Management
  UE User Equipment
  The invention claimed is:
  1. A method performed by a core network control plane entity, the method comprising:
    receiving a Registration Request message from a wireless device, the Registration Request comprising at least one of an indicator that the registration is for Short Message Service (SMS) or an indication that the wireless device supports SMS delivery over Non-Access Stratum (NAS), wherein the Registration Request message for the SMS comprises requested Network slice Selection Assistance information (NSSAI) indicating one or more requested Single Network slice Selection Assistance information (S-NSSAI) for the SMS;

obtaining SMS subscription data comprising one or more subscribed S-NSSAI for the SMS;

determining the one or more allowed S-NSSAI for the SMS based on the subscribed S-NSSAI for the SMS;

obtaining at least one of a wireless device context in SMSF for one or more subscribed S-NSSAI and a wireless device context in SMSF for the one or more allowed S-NSSAI;

selecting a Short Message Service Function (SMSF) for the at least one of the one or more allowed S-NSSAI for the SMS;

sending a Registration Response message to the wireless device indicating the one or more allowed S-NSSAI for the SMS; and sending to the SMSF selected for the at least one of the one or more allowed S-NSSAI an activation message indicating at least the identity of the core network control plane entity and an identity of the wireless device, wherein selecting the SMSF for each of the one or more allowed S-NSSAI for the SMS is based on the obtained wireless device context in SMSF.

2. The method of claim 1, where the wireless device context in SMSF for the one or more subscribed S-NSSAI indicates an identity of the SMSF for each of the one or more subscribed S-NSSAI and the wireless device context in SMSF for the one or more allowed S-NSSAI indicates an identity of the SMSF for each of the one or more allowed S-NSSAI.

3. The method of claim 2, wherein the wireless device context in SMSF for the one or more subscribed S-NSSAI is obtained from a User Data Management function.

4. The method of claim 2, wherein the wireless device context in SMSF for the one or more allowed S-NSSAI is obtained from at least one of a policy Control Function (PCF) or Network Registry Function (NRF) or an internal configuration.

5. The method of claim 1, wherein the method further comprises:

receiving a NAS message comprising a SMS message, the NAS message comprising one of the allowed S-NSSAI;

determining based on the allowed S-NSSAI the corresponding SMSF; and forwarding the SMS message to the SMSF for the allowed S-NSSAI.

6. The method of claim 1, further comprising:

receiving a request message from the SMSF to determine reachability of the wireless device over one of the allowed S-NSSAI;

determining the reachability of the wireless device over the allowed S-NSSAI; and upon determining the wireless device is reachable, receiving an SMS message for delivery to the wireless device on the allowed S-NSSAI.

7. The method of claim 1, further comprising receiving an indication for an SMS message to be delivered to the wireless device over an S-NSSAI that was not indicated to the wireless device as one of the allowed S-NSSAI;

instructing the UE to add the S-NSSAI into the one or more allowed S-NSSAI or to register for SMS requesting the S-NSSAI; and delivering the SMS message to the UE over the S-NSSAI.

8. The method of claim 1, wherein the method further comprises:

registering, by a Short Message Service function (SMSF) entity, an SMSF profile in a network repository entity, wherein the profile comprises one or more S-NSSAI supported by the SMSF entity.

9. The method of claim 8, further comprising:

receiving, by the SMSF entity, a request comprising a short message service (SMS) message for delivery to a user equipment (UE);

upon determining, by the SMSF entity, the SMS entity is allocated to one or more S-NSSAI determining the user equipment reachability on one of the one or more S-NSSAI;

upon determining, by the SMSF entity, reachability of the user equipment on one of the one or more S-NSSAI, sending the SMS message towards the UE indicating the S-NSSAI over which the SMS message is to be delivered.

10. The method of claim 9, wherein determining the user equipment reachability on any of the one or more S-NSSAI further comprises selecting, by the SMSF entity, the S-NSSAI for which reachability of the UE is to be determined.

11. The method of claim 10, wherein upon receiving, by the SMSF entity, an indication that the UE is not reachable over the selected S-NSSAI, selecting another S-NSSAI of the one or more S-NSSAI over which reachability of the UE is to be determined.

12. The method of claim 9, wherein the request further comprises one of the one or more S-NSSAI and the method further comprises determining, by the SMSF entity, reachability over the S-NSSAI, wherein the S-NSSAI included in the request is the one of the one or more S-NSSAI.

13. The method of claim 12, further comprising receiving, by the SMSF entity, an indication that the UE is not reachable over the S-NSSAI comprised in the request; and notifying, by the SMSF entity, an originator of the request that the SMS message is not deliverable over the S-NSSAI.

14. A control plane entity comprising a processing circuitry and memory, the memory containing instructions executable by the processing circuitry whereby the control plane entity is configured to:

receive a Registration Request message from a wireless device, the Registration Request comprising at least one of an indicator that the registration is for Short Message Service (SMS) or an indication that the wireless device supports SMS delivery over Non-Access Stratum (NAS), wherein the Registration Request message for the SMS comprises requested Network slice Selection Assistance information (NSSAI) indicating one or more requested Single Network slice Selection Assistance information (S-NSSAI) for the SMS;

obtain SMS subscription data comprising one or more subscribed S-NSSAI for the SMS;

determine the one or more allowed S-NSSAI for the SMS based on the subscribed S-NSSAI for the SMS;

obtaining at least one of a wireless device context in SMSF for one or more subscribed S-NSSAI and a wireless device context in SMSF for the one or more allowed S-NSSAI;

select a Short Message Service Function (SMSF) for the at least one of the one or more allowed S-NSSAI for the SMS;

send a Registration Response message to the wireless device indicating the one or more allowed S-NSSAI for the SMS; and send to the SMSF selected for the at least one of the one or more allowed S-NSSAI an activation message indicating at least the identity of the core network control plane entity and an identity of the wireless device, wherein selecting the SMSF for each of the one or more allowed S-NSSAI for the SMS is based on the obtained wireless device context in SMSF.

\* \* \* \* \*